United States Patent
Trudell et al.

(10) Patent No.: US 12,502,655 B2
(45) Date of Patent: Dec. 23, 2025

(54) HALLOYSITE-BASED NANOCOMPOSITES AND METHODS OF MAKING AND USING THE SAME

(71) Applicant: University of New Orleans, New Orleans, LA (US)

(72) Inventors: Mark L. Trudell, New Orleans, LA (US); Jumanah Hamdi, New Orleans, LA (US); John B. Wiley, New Orleans, LA (US)

(*) Notice: Subject to any disclaimer, the term of this patent is extended or adjusted under 35 U.S.C. 154(b) by 80 days.

(21) Appl. No.: 16/982,480

(22) PCT Filed: Mar. 20, 2019

(86) PCT No.: PCT/US2019/023156
§ 371 (c)(1),
(2) Date: Sep. 18, 2020

(87) PCT Pub. No.: WO2019/183215
PCT Pub. Date: Sep. 26, 2019

(65) Prior Publication Data
US 2021/0016250 A1  Jan. 21, 2021

Related U.S. Application Data

(60) Provisional application No. 62/645,650, filed on Mar. 20, 2018.

(51) Int. Cl.
| | | |
|---|---|---|
| *B01J 21/16* | (2006.01) | |
| *B01J 23/44* | (2006.01) | |
| *B01J 35/00* | (2024.01) | |
| *B01J 35/02* | (2006.01) | |
| *B01J 35/45* | (2024.01) | |
| *B01J 35/55* | (2024.01) | |
| B82Y 30/00 | (2011.01) | |
| B82Y 40/00 | (2011.01) | |

(52) U.S. Cl.
CPC ............. *B01J 21/16* (2013.01); *B01J 23/44* (2013.01); *B01J 35/45* (2024.01); *B01J 35/55* (2024.01); *B01J 2235/10* (2024.01); *B01J 2235/15* (2024.01); *B01J 2235/30* (2024.01); *B82Y 30/00* (2013.01); *B82Y 40/00* (2013.01)

(58) Field of Classification Search
CPC ........ B01J 21/16; B01J 23/44; B01J 35/0013; B01J 35/006; B01J 35/026
See application file for complete search history.

(56) References Cited

FOREIGN PATENT DOCUMENTS

CN  103774124  12/2015

OTHER PUBLICATIONS

Vinokurov et al., Chemical Record, (2018), v18, p. 858-867, published on Jan. 4, 2018. (Disclosed in IDS and provided by Applicant).*
Mu et al., RSC Adv., (2014), v4, p. 39439-39445.*
Carrillo et al., Applied Catalysis B, (2015), v164, p. 443-452.*
Salvo et al., Molecules, (2016), v.21, p. 1288 (provided by Applicant).*
Nejabat et al J of Controlled Release (2023) v354 p. 221-242.*
Google search "Is nanorod a nanoparticle?" on Jan. 30, 2025.*
Salvo, Anna, et al., "Advances in Organic and Organic-Inorganic Hybrid Polymeric Supports for Catalytic Applications", Molecules, Sep. 28, 2016, p. 1288, vol. 21, No. 10.
Liu, Peng, et al., "Silver Nanoparticle Supported on Halloysite Nanotubes Catalyzed Reduction of 4-Nitrophenol (4-NP)", Applied Surface Science, Jan. 15, 2009, pp. 3989-3993, vol. 225, No. 7, Elsevier, Amsterdam, Netherlands.
Wang Li, et al., "Halloysite-Nanotube-Supported Ru Nanoparticles for Ammonia Catalytic Decomposition to Produce CO $\chi$-Free Hydrogen", Energy & Fuels, Jul. 21, 2011, pp. 3408-3416, vol. 25, No. 8, Washington, DC, United States.
Vinokurov, et al., "Nanoparticles Formed onto/into Halloysite Clay Tubules: Architectural Synthesis and Applications", The Chemical Record, Jan. 4, 2018, pp. 858-867, vol. 18, No. 7-8.

* cited by examiner

*Primary Examiner* — Yong L Chu
(74) *Attorney, Agent, or Firm* — Intellectual Property Consulting, LLC; Stephen M. Kepper

(57) ABSTRACT

This invention is directed to transition metal-based-halloysite nanocomposites and methods of making and using the same.

4 Claims, 25 Drawing Sheets

| Ratio Pd/Hal | Pd(OAc)$_2$ (mmol) | Halloysite (mmol) | Reducing Agent | Capping Agent (Trisodium citrate) | Solvent (Water) | Encapsulation |
|---|---|---|---|---|---|---|
| 1:1 | 0.06 | 0.06 | Ascorbic Acid (10 mmol) | 0.60 mmol | 25 mL | No |
| 1:1 | 0.06 | 0.06 | Sodium ascorbate (10 mmol) | 0.60 mmol | 25 mL | Yes (optimum) |
| 2:1 | 0.12 | 0.06 | Sodium ascorbate (10 mmol) | 1.2 mmol | 25 mL | Yes |
| 1:2 | 0.06 | 0.12 | Sodium ascorbate (10 mmol) | 0.60 mmol | 25 mL | Partial |
| 1:1 | 0.60 | 0.60 | Sodium ascorbate (100 mmol) | 6.0 mmol | 50 mL | Yes |
| 2:1 | 3.6 | 1.8 | Sodium ascorbate (300 mmol) | 36 mmol | 100 mL | Yes |
| 1:1 (Scale up) | 3.0 | 3.0 | Sodium ascorbate (500 mmol) | 30 mmol | 150 mL | Yes |
| 2:1 (Scale up) | 6.0 | 3.0 | Sodium ascorbate (500 mmol) | 60 mmol | 150 mL | Yes |

*FIG. 2*

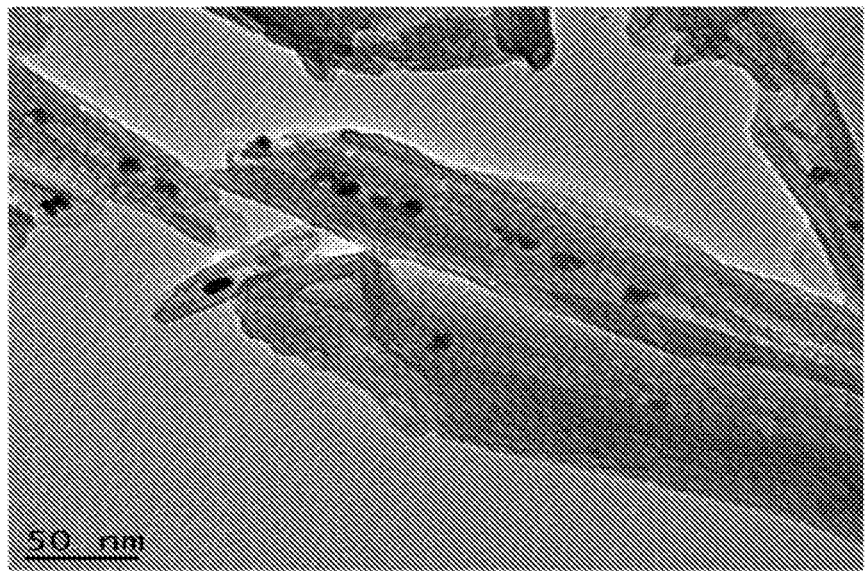
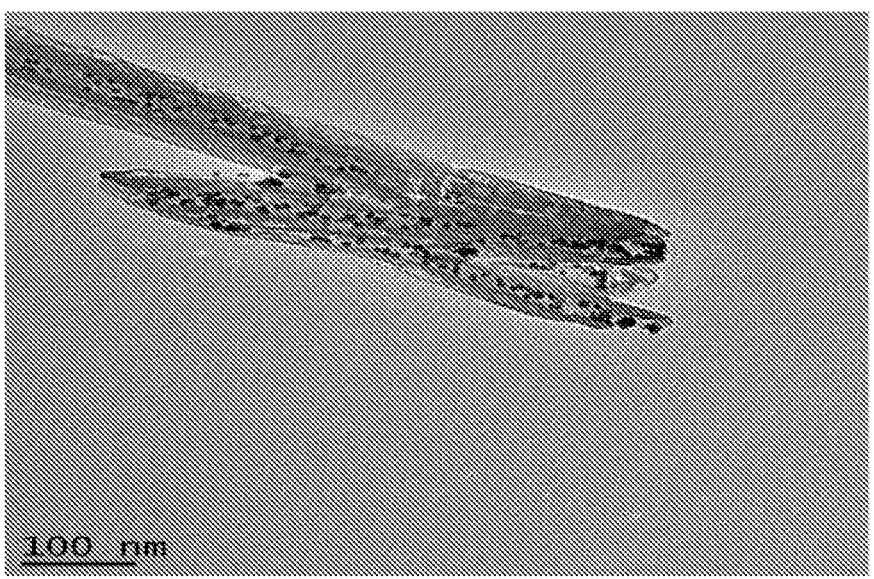
*FIG. 3*

| Entry | Alkene | Solvent | Yield |
|---|---|---|---|
| 1 | Cinnamic acid | Ethanol | 100% |
| 2 | Cinnamic acid | Water | 98% |
| 3 | Diphenylacetylene | Ethanol | 97% |
| 4 | Diphenylacetylene | Water | 88% |
| 5 | Isoprene | Hexane | 60% |
| 6 | α-pinene | Ethanol | 52% |

| Alkene/Solvent/10% Pd/-Hal (wt) | Cycle | Conversion (%) |
|---|---|---|
| Cinnamic acid/Ethanol | 1 | 100% |
| | 2 | 98% |
| | 3 | 95% |
| | 4 | 86% |
| | 5 | 82% |
| Diphenylacetylene/Ethanol | 1 | 97% |
| | 2 | 92% |
| | 3 | 87% |

*FIG. 6*

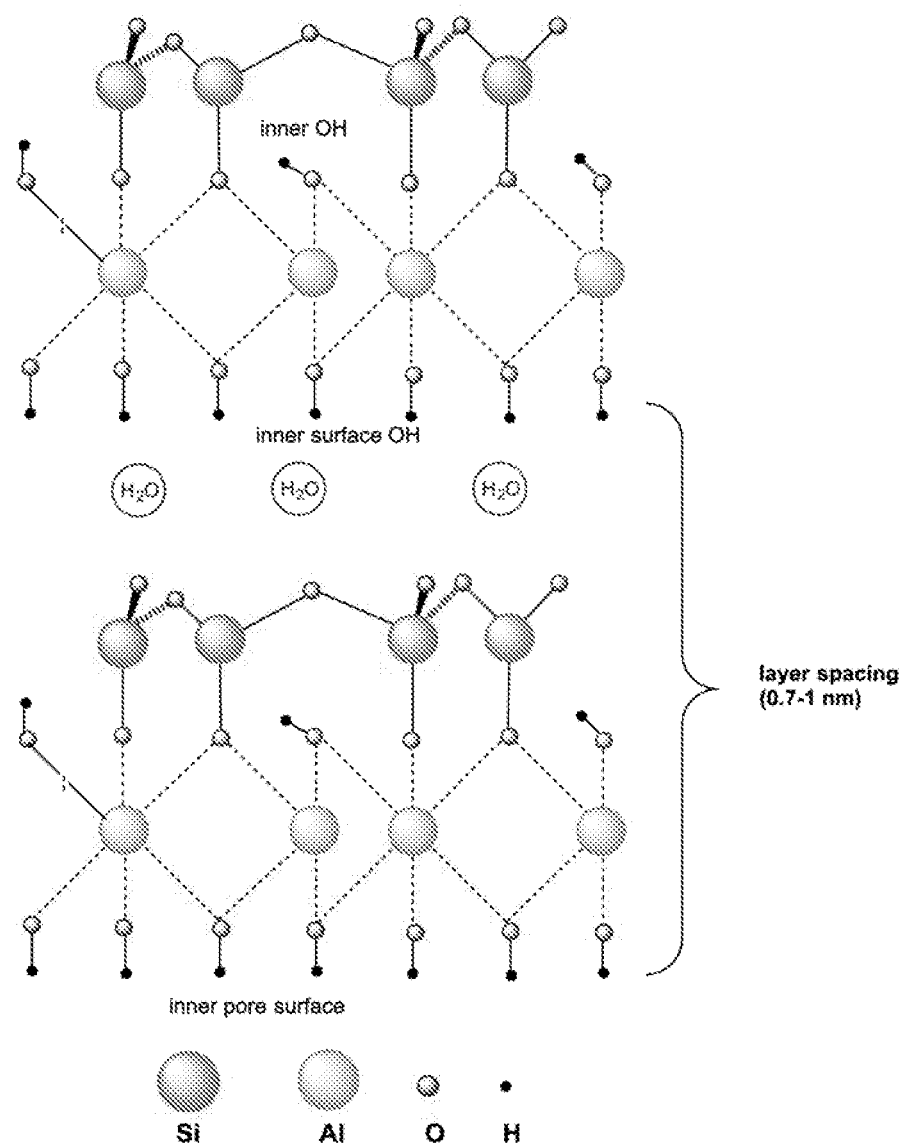
FIG. 8 CON'T

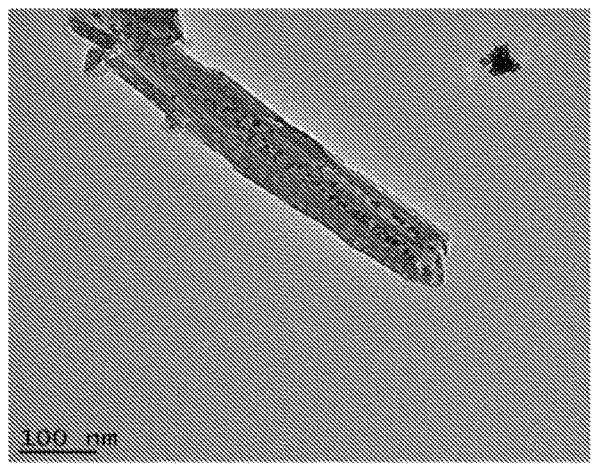
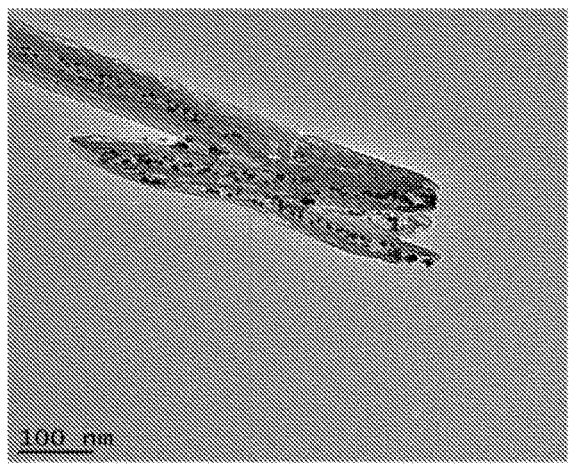
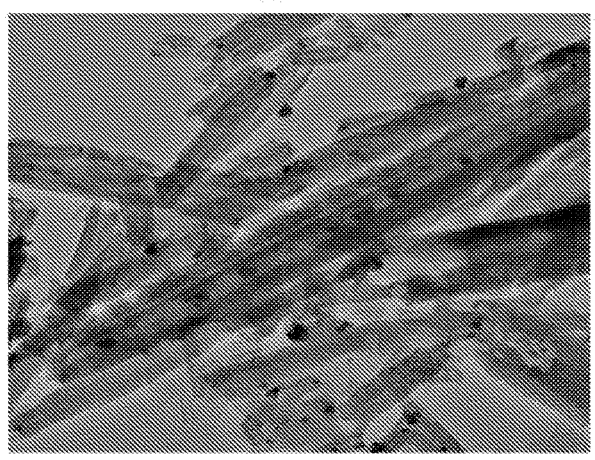
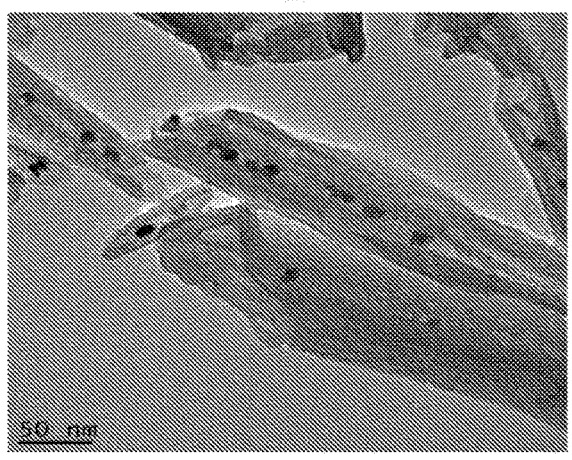
*FIG. 9*

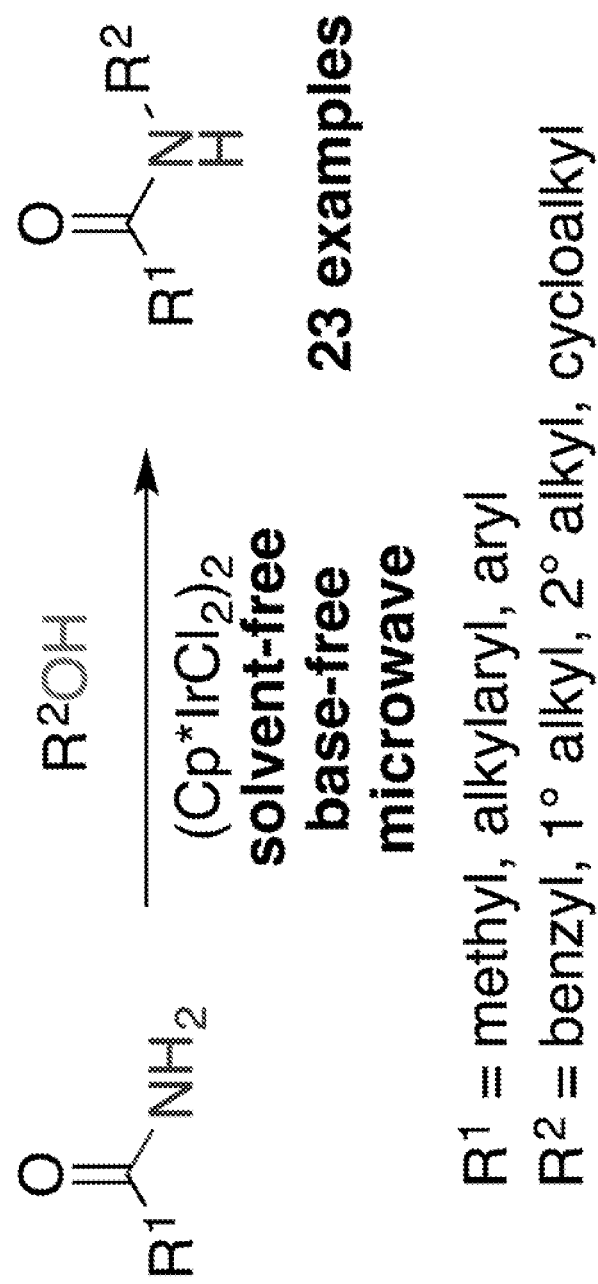
FIG. 12 CON'T

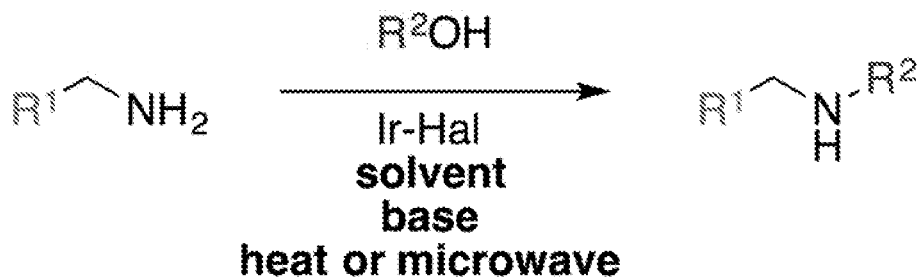
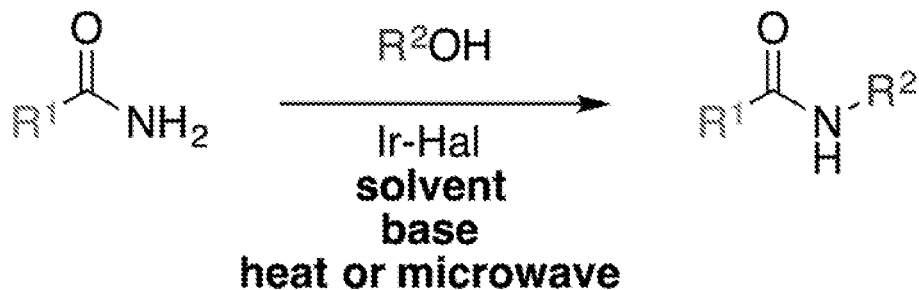
FIG. 15

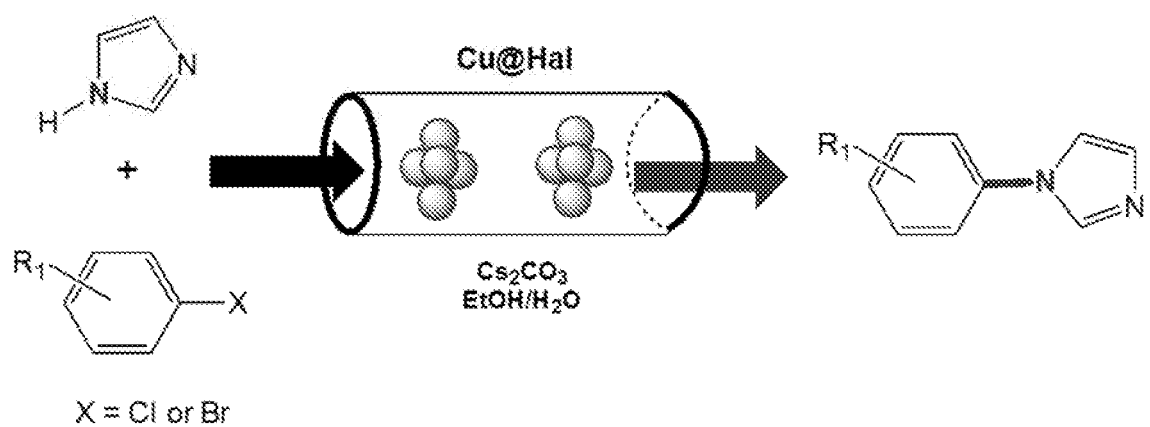
N-(4-Cyanophenyl)-imidazole
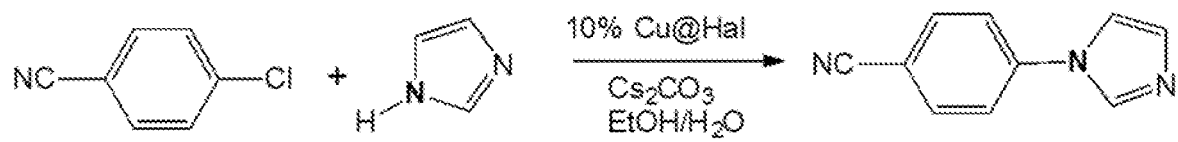
FIG. 24

HALLOYSITE-BASED NANOCOMPOSITES AND METHODS OF MAKING AND USING THE SAME

This application claims priority from U.S. Provisional Patent Application No. 62/645,650, filed on Mar. 20, 2018, the contents of each of which are incorporated herein by reference in its entirety.

All patents, patent applications and publications cited herein are hereby incorporated by reference in their entirety. The disclosures of these publications in their entireties are hereby incorporated by reference into this application in order to more fully describe the state of the art as known to those skilled therein as of the date of the invention described and claimed herein.

This patent disclosure contains material that is subject to copyright protection. The copyright owner has no objection to the facsimile reproduction by anyone of the patent document or the patent disclosure as it appears in the U.S. Patent and Trademark Office patent file or records, but otherwise reserves any and all copyright rights.

FIELD OF THE INVENTION

This invention is directed to transition metal-based-halloysite nanocomposites and methods of making and using the same.

BACKGROUND OF THE INVENTION

The Suzuki-Miyaura cross-coupling reaction between an aryl halide and a phenylboronic acid is a very common method for the C—C bond forming reaction in modern organic synthesis. Conventionally, these reactions are usually carried out in organic solvents and catalyzed by various soluble Pd/ligand systems. Phosphine-based palladium catalyst systems are widely used, but they can be expensive, potentially toxic, unrecoverable, and sensitive to oxygen and water. The development of heterogeneous catalyst systems has attracted more attention as an effective catalytic method. The invention described herein is directed towards new catalyst systems comprising metal-nanoparticle composite materials that overcome obstacles associated with traditional homogeneous catalyst systems.

SUMMARY OF THE INVENTION

Aspects of the invention are directed towards a halloysite-based nanocomposite, the nanocomposite comprising transition metal-nanoparticles embedded upon the internal surface of the halloysite nanotube.

In embodiments, the internal diameter of the halloysite nanotube is less than about 40 nm.

In embodiments, the size of the nanoparticle is less than about 40 nm. For example, the size of the nanoparticle is less than about 25 nm. For example, the nanoparticle is about 5-10 nm (such as PdNP), about 2-10 nm (such as CuNP), or about 8-16 nm (such as IrNP).

In embodiments, the transition metal comprises a metal of any one of groups 3-12 of the period table. In embodiments, the transition metal comprises a metal of any one of groups 8-11 of the periodic table. In embodiments, the transition metal comprises a metal of group 9 of the periodic table (such as Ir), group 10 of the period table (such as Pd), or group 11 of the periodic table (such as Cu).

In embodiments, the transition metal comprises copper (Cu), palladium (Pd), Iridium (Ir), rhodium (Rh), ruthenium (Ru), silver (Ag), osmium (Os), platinum (Pt) or any combination thereof. For example, the nanoparticle comprises Cu@Hal nanocomposites.

In embodiments, the transition metal comprises a transition metal alloy.

In embodiments, the nanocomposite catalyzes the formation of C—C bonds, C—N bonds, C—O bonds, C—H bonds, or any combination thereof.

Aspects of the invention are further directed towards a transition metal catalyst system, wherein the transition metal catalyst system comprises the transition metal-based halloysite nanocomposite described herein. The transition metal catalyst system can further comprise a solvent and a base.

Aspects of the invention are also directed towards methods of making a transition metal-based halloysite nanocomposite and transition metal catalyst system. In embodiments, the method comprises providing a transition metal nanoparticle; and encapsulating the transition metal nanoparticle within a halloysite nanotube, wherein the nanoparticle is embedded upon the internal surface of the halloysite nanotube.

In embodiments, the transition metal nanoparticle is produced within the nanotube.

In embodiments, wherein the nanoparticle is of an appropriate size for encapsulation and embedding within halloysite.

Aspects of the invention are still further directed towards methods of making a transition metal-halloysite-based nanocomposite. In embodiments, the method comprise admixing a transition metal, a reducing agent, a capping agent, and a solvent to produce a suspension of transition metal-nanoparticles; and admixing the suspension of transition metal-nanoparticles and halloysite to produce the transition metal-halloysite-nanoparticle composite.

In embodiments, the solvent comprises water. In embodiments, the solvent comprises water and/or alcohol, such as methanol, ethanol, or an alkyl alcohol. For example, the solvent comprises aqueous alcohol.

In embodiments, the reducing agent comprises sodium ascorbate ($C_8H_7O_8Na$), ascorbic acid, potassium ascorbate, citric acid, trisodium citrate, reducing sugars, or reduction via sodium borohydride. For example, the amount of sodium ascorbate is between about 10 mmol and about 500 mmol. In another example, the amount of sodium ascorbate is greater than 500 mmol.

In embodiments, the capping agent comprises polyvinylpyrrolidone (PVP), trisodium citrate, ascorbic acid, potassium ascorbate, citric acid, trisodium citrate, reducing sugars, or reduction via sodium borohydride. In embodiments, the amount of trisodium citrate is between about 0.6 mmol and 60 mmol. In embodiments, the amount of the capping agent is greater than 60 mmol.

In embodiments, palladium comprises palladium acetate and/or palladium chloride. In embodiments, the amount of the palladium acetate is between about 0.06 mmol and 6 mmol. In embodiments, the amount of the palladium comprises greater than 6 mmol.

In embodiments, the amount of halloysite is between about 0.06 mmol and 3 mmol.

In embodiments, the molar ratio of the palladium nanoparticles to halloysite (Pd:Hal) is about 1:1, 2:1, 1:2.

In embodiments, the nanoparticle comprises Ir nanoparticles, such as Ir@Hal. For example, the iridium comprises iridium chloride. In embodiments, the molar ratio of the irridium nanoparticles to halloysite (Ir:Hal) is about 1:1, 2:1, 1:2.

In embodiments, the nanoparticle comprises copper nanoparticles, such as Cu@Hal. For example, the copper comprises copper nitrate. In embodiments, the molar ratio of the copper nanoparticles to halloysite (Cu:Hal) is about 1:1, 2:1, 1:2.

Still further, aspects of the invention are directed towards a method of using the transition metal-halloysite-based nanocomposite for catalyzing a coupling reaction. In embodiments, the method comprises admixing a first compound and a second compound with halloysite-based nanocomposite in a solvent for a period of time, wherein the halloysite-based nanocomposite catalyzes the reaction between the first compound and the second compound.

In embodiments, the coupling reaction comprises an Ullman reachtion, a Negishi coupling reaction, a Heck reaction, a Suzuki reaction, a Stille reaction, a Hiyama reaction, a Sonogashira reaction, a Buchwald-Hartwig reaction, a Kumada reaction, or a Heck-Matsuda reaction.

In embodiments, the method produces a biphenyl compound.

In embodiments, the method produces a substituted aryl compound or substituted heteroaryl compound.

In embodiments, the halloysite-based nanocomposite comprises about 1.0-10 mol % halloysite-based nanocomposite, such as about 5.0-10 mol % halloysite-based nanocomposite.

In embodiments, the solvent comprises toluene; aqueous alcohol; 1,4-dioxane and $C_5CO_3$; aqueous propanol; or water.

In embodiments, the base is $Cs_2CO_3$, $K_2CO_3$, $NaHCO_3$, t-BuOK, NaOAc, NaOH, KOH, CsF.

In embodiments, the admixture is incubated for a period of time at a temperature of about 25° C. to about 80° C.

In embodiments, the first compound comprises an arylboronic acid and the second compound comprises an aryl halide or aryl pseudohalide.

In embodiments, the aryl halide comprises aryl bromide, aryl chloride, aryl iodide, aryl pseudo halide, or aryl sulfonates (such as tosylate, mesylate, and triflate).

Aspects of the invention are also directed towards methods of using the transition metal-based halloysite-based nanocomposite for hydrogenation of a compound containing carbon-carbon double or triple bonds. In embodiments, the method comprises admixing the compound with halloysite-based nanocomposite, $H_2$, and a solvent for a period of time at room temperature, wherein the halloysite-based nanocomposite catalyzes the hydrogenation of the compound.

In embodiments, the halloysite-based nanocomposite comprises 1-10% wt nanocomposite. In embodiments, the halloysite-based nanocompsite comprises greater than 10% wt nanocomposite.

In embodiments, the compound comprises an alkene or an alkyne. Non-limiting examples of the alkene comprises cinnamic acid, isoprene, dimethyl fumarate, dimethyl maleate, cyclohexene, styrene, alpha-pinene, methyl methacrylate, acrylonitrile, acrylic acid, octene, cyclopenteneone, cyclohexenone. Non-limiting examples of the alkyne comprises diphenyl acetylene, phenacetylene, 3-hexyne, or methyl propiolate.

In embodiments, the alkene comprises cinnamic acid, diphenylacetylene, isoprene, or α-pinene.

In embodiments, the solvent comprises EtOH or hexane. In embodiments, the solvent comprises alcohols. ether, esters hydrocarbon chlorohydrocarbon, water. For example, the solvent comprises methanol, tetrahydrofuran, t-butyl methyl ether, ethyl acetate, toluene, benzene, pentane, dichloromethane, chloroform.

Embodiments described herein can further comprise recovering and/or recycling the halloysite-based nanocomposite.

In embodiments, the period of time comprises about 1 hour, about 2 hours, about 6 hours, about 12 hours, about 24 hours, or longer than 24 hours.

Other objects and advantages of this invention will become readily apparent from the ensuing description.

BRIEF DESCRIPTION OF THE FIGURES

FIG. 2 shows optimized conditions for Pd-Halloysite nanocomposites.

FIG. 3 shows TEM images of PD nanoparticle:halloysite (1:1) nanocomposite Pd nanoparticles (black spheres) in the translucent halloysite tubes.

FIG. 6 shows catalyst recycling.

FIG. 9 shows a TEM image of the encapsulated Pd nanoparticles (black spheres) in the translucent halloysite tubes FIG. 10 poster shows Suzuki-Miyaura reaction between arylboronic acid and aryl halides catalyzed by Pd-HAL.

FIG. 15 shows an embodiment of iridium chemistry, for example the N-alkylation of amines and amides with alcohols.

FIG. 24 shows Cu@Hal cayalyzed Ullmann Coupling Reaction

DETAILED DESCRIPTION OF THE INVENTION

Abbreviations and Definitions

Figure 1:
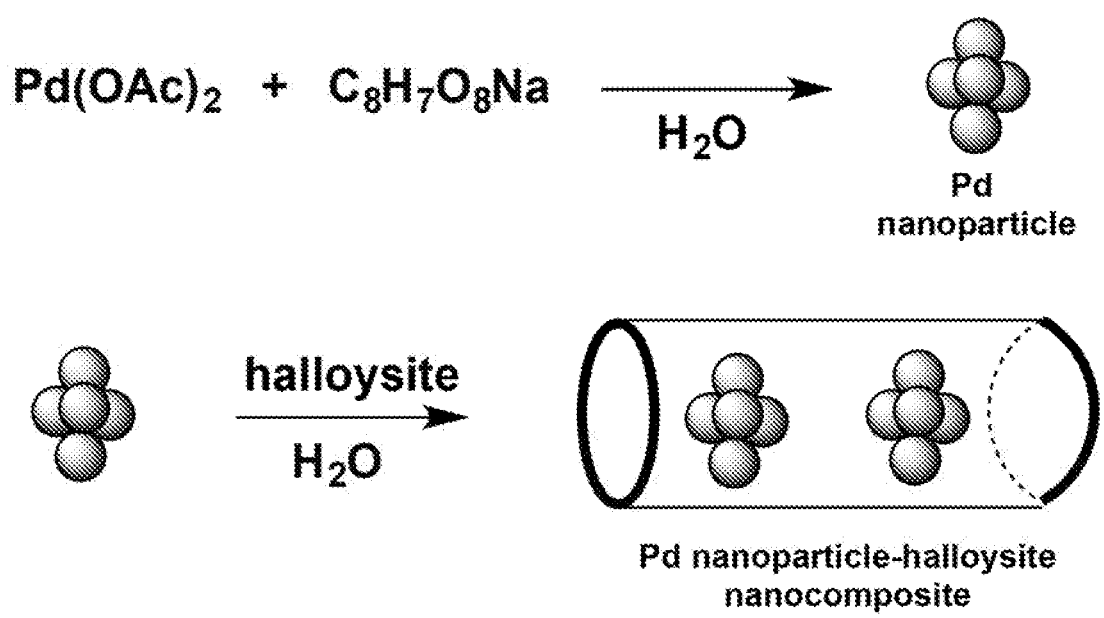
FIG. 1 shows the synthesis of Pd-Halloysite nanocomposite.

Detailed descriptions of one or more preferred embodiments are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in any appropriate manner.

The singular forms "a", "an" and "the" include plural reference unless the context clearly dictates otherwise. The use of the word "a" or "an" when used in conjunction with the term "comprising" in the claims and/or the specification may mean "one," but it is also consistent with the meaning of "one or more," "at least one," and "one or more than one."

Wherever any of the phrases "for example," "such as," "including" and the like are used herein, the phrase "and without limitation" is understood to follow unless explicitly stated otherwise. Similarly "an example," "exemplary" and the like are understood to be nonlimiting.

The term "substantially" allows for deviations from the descriptor that do not negatively impact the intended purpose. Descriptive terms are understood to be modified by the term "substantially" even if the word "substantially" is not explicitly recited.

The terms "comprising" and "including" and "having" and "involving" (and similarly "comprises", "includes," "has," and "involves") and the like are used interchangeably and have the same meaning. Specifically, each of the terms is defined consistent with the common United States patent law definition of "comprising" and is therefore interpreted to be an open term meaning "at least the following," and is also interpreted not to exclude additional features, limitations, aspects, etc. Thus, for example, "a process involving steps a, b, and c" means that the process includes at least steps a, b and c. Wherever the terms "a" or "an" are used, "one or more" is understood, unless such interpretation is nonsensical in context.

As used herein, the term "about" can mean approximately, roughly, around, or in the region of. When the term "about" is used in conjunction with a numerical range, it modifies that range by extending the boundaries above and below the numerical values set forth. For example, the term "about" is used herein to modify a numerical value above and below the stated value by a variance of 20 percent up or down (higher or lower).

Compositions of Matter

The invention is directed towards new catalytic systems and compositions for high yield, low cost, environmentally safe (e.g., "green methods") for generating important complex molecules, including those essential to agrochemical, pharmaceutical and other fine chemical applications.

Embodiments of the invention are directed towards a nanocomposite comprising transition metal-nanoparticles embedded upon a surface of a clay or clay-based material. The clay materials can be natural materials (such as natural clays like halloysite) but can also be synthetic materials, such as scrolled kaolinite. See *J. Phys. Chem. C*, 2012, 116 (15), pp 8824-8833.

Kaolinite has the formula $Al_2Si_2O_5(OH)_4$ and typically occurs in plate forms. Halloysite has a similar composition except that it contains additional water molecules between the layers and most commonly has a tubular morphology. Halloysite loses its interlayer water very easily so it is often observed in a partly dehydrated state. In its fully hydrated form the formula is $Al_2Si_2O_5(OH)_4\text{-}2H_2O$. Kaolinite is a very important industrial mineral, and halloysite is becoming increasingly important due mainly to its use in nanotechnology applications which take advantage of its tubular habit.

An exemplary embodiment comprises a halloysite-based nanocomposite comprising transition metal nanoparticles embedded upon the internal surface of the halloysite nanotube. The skilled artisan will recognized that any clay material with a lumen and/or interior surface wherein the nanoparticles can embed can be utilized by the invention.

In embodiments, the inner layers of the clay material, such as the inner layers of the halloysite, can be etched so as to create pores that allow the nanoparticles to embed in the walls of the etched material. For examples, the inner layers can be 'acid etched', such as acid etched halloysite. See J. Mater. Chem. B, 2013, 1, 2894-2903.

In embodiments, the clay material embedded with nanoparticles is of a structure with an inner surface, an outer surface, and/or a lumen. For example, the material is a halloysite nanotube with a lumen diameter of less than about 20 nm, which can accommodate nanoparticles with a diameter of less than about 20 nm. The nanoparticles can embed upon the inner surface within the lumen of the structure. The lumen of unmodified halloysite is about 10-15 nm, which can accomododate nanoparticles with a diameters of less than about 15 nm. Chemically modified or etched halloysite can have a lumen diameter of about 30-40 nm, and can accommodate larget nanoparticals or aggregates, such as those with diameters of less than about 40 nm. The skilled artisan will recognize that the nanoparticle embedded within the lumen (such as on the inner surface) of the nanotube can be any diameter that is able to fit within the lumen of the nanotube.

Figure 16:
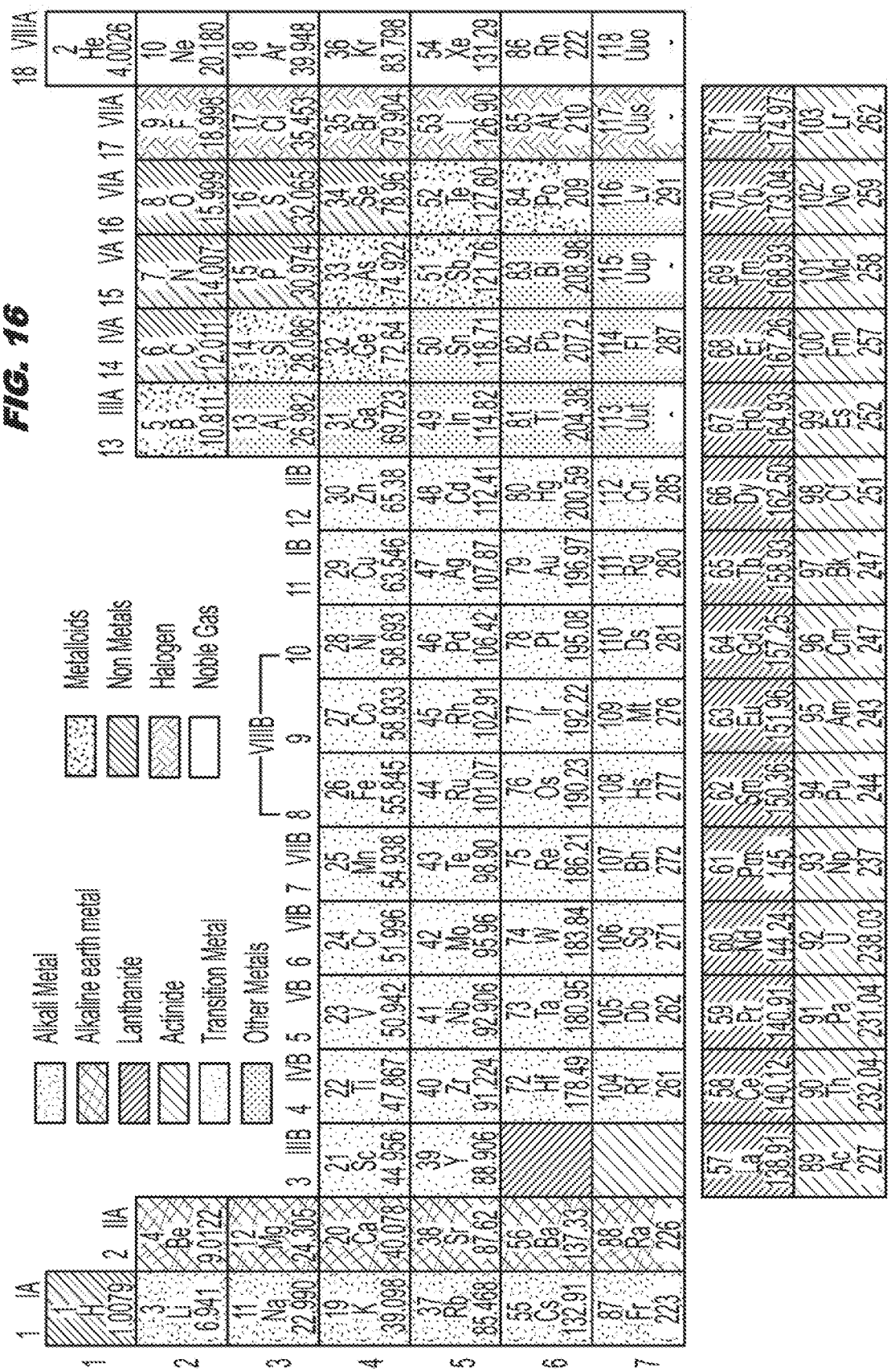
FIG. 16 shows the periodic table, and shows transition metals (see groups/columns 3-12).

In embodiments, the transition metal comprises a transition metal of groups 3-12 of the periodic table (see FIG. 16), or a transition metal alloy. Embodiments can comprise a transition metal of any one of groups 8-11 of the periodic table. For example, the transition metal comprises a metal of group 10 of the period table. In embodiments, the transition metal comprises a noble metal. The nobel metals are those that are resistant to corrosion and oxidation in moist air. Thus, non-limiting examples of transition metals that can be utilized herein comprise copper (Cu), palladium (Pd), Iridium (Ir), rhodium (Rh), ruthenium (Ru), silver (Ag), osmium (Os), platinum (Pt), gold (Au), or any combination thereof. In embodiments, the transition metal is palladium. In embodiments, the transition metal is iridium. In embodiments, the transition metal is not gold, as the ligand and method of attachment of gold is different than that of other transition metals, such as palladium.

In embodiments, the nanocomposite comprising transition-metal nanoparticles can catalyze the formation of bonds, such as carbon-oxygen (C—O) bonds, carbon-hydrogen (C—H) bonds, carbon-carbon (C—C) bonds or carbon-nitrogen (C—N) bonds. For example, see coupling reactions described herein.

Embodiments further comprise a transition metal catalyst system comprising the transition-metal-based nanocomposite described herein. For example, the transition metal catalyst system comprises a halloysite-based nanocomposite, such as a palladium-halloysite-based nanocomposite. The skilled artisan will recognize that a transition metal catalyst system can include other components, such as a solvent and/or a base. Non-limiting examples of solvents comprise hydrocarbon (such as hexane, benzene, toluene), cholorinated hydrocarbons (such as chloroform, dichloromethane), ether (such as diethyl ether, dioxane), polar aprotic (such as dimethylformamide, dimethylsulfoxide), polar protic (such as ethanol, propanol, and water). A non-limiting example of a base comprises alkali metal salt, such as potassium carbonate, sodium carbonate, sodium bicarbonate, sodium acetate potassium tertbutoxide, cesium carbonate, and cesium fluoride.

Methods of Making and Using

Aspects of the invention are directed towards methods of making and using the nanocompsites as described herein, such as transition metal-halloysite-based nanocomposites.

For example, embodiments are directed towards methods of making a transition-metal-halloysite-based nanocompsites comprising providing/synthesizing a transition metal nanoparticle and encapsulating the transition metal nanoparticle within a halloysite nanotube. The nanoparticle can be embedded upon the internal surface of the halloysite nanotube, such as within the lumen of the nanotube.

In embodiments, the transition metal nanoparticles can be synthesized in a distinct and/or separate step prior to being admixed with the halloysite. Alternatively, the transition metal nanoparticle can be synthesized within the lumen of the nanotube itself. For example, the transition metal nanoparticles can be synthesized within the lumens of a synthetic scroll structure.

Referring to Example 2, a solution of $Pd(OAc)_2$ (0.014 g, 0.060 mmol) in deionized water (10 mL) was prepared in a 50 mL Erlenmeyer flask. A solution of L-sodium ascorbate (1.9 g, 10 mmol) in deionized water (15 mL) was added to the palladium acetate solution followed by addition of solution of trisodium citrate (0.17 g, 0.60 mmol) in deionized water (10 mL). The combined solution was allowed to stir for 15 min at room temperature. During the first 10 minutes, the initial light orange color of the palladium acetate solution mixture turned black, indicating the formation of Pd nanoparticles. After 15 min, no more color changes were observed and the solution was left to rest at room temperature, in open air for 80 minutes. Halloysite (0.017 g, 0.06 mmol) was added to the Pd nanoparticle solution and the colloid mixture was stirred for 15 min. The mixture was then allowed to rest at room temperature for 10 min. The mixture was centrifuged (6000 rpm) and the liquid was decanted from the solid residue. The residue was washed with deionized water (15 mL) centrifuged and decanted. The washing, centrifugation and decantation process was repeated with another portion of deionized water (15 mL) and then with isopropyl alcohol (3×15 mL). The resultant powder was dried at room temperature for 24 h in a desiccator ($Ca_2SO_4$). TEM and XRD were used to characterize and verify the encapsulation of Pd nanoparticles in the halloysite.

Embodiments further comprise methods of making a transition metal-halloysite-based nanocomposite. Methods for making a transition metal-halloysite-based nanocomprise comprises admixing the transition metal, a reducing agent, a capping agent, and a solvent (for example water or ethanol) to produce a suspension of transition metal nanoparticles; and admixing the suspension of transition metal nanoparticles and halloysite to produce the transition metal-halloysite-nanoparticle composite.

For example, methods for making a palladium-halloysite-based nanocomprise comprises admixing palladium ($PdX_2$, such as $Pd(Oac)_2$), a reducing agent, a capping agent, and a solvent (for example water or ethanol) to produce a suspension of Pd-nanoparticles; and admixing the suspension of Pd-nanoparticles and halloysite to produce the palladium-halloysite-nanoparticle composite.

The skilled artisan will recognize that any reducing agent can be used, non-limiting examples of which comprise sodium ascorbate ($C_8H_7O_8Na$), ascorbic acid, potassium ascorbate, citric acid, trisodium citrate, reducing sugates, or reduction via sodium borohydride.

The skilled artisan will further recognize that any capping agent can be used, non-limiting examples of which comprise polyvinylpyrrolidone, trisodium citrate, ascorbic acid, potassium ascorbate, citric acid, reducing sugars, reduction via sodium borohydride.

In another embodiment, a solution of $Pd(OAc)_2$ (0.030 g, 0.13 mmol) in deionized water (10 mL) was prepared in a 50 mL Erlenmeyer flask. A solution of L-sodium ascorbate (1.9 g, 10 mmol) in deionized water (15 mL) was added to the palladium acetate solution followed by addition of solution of citric acid (0.12 g, 0.60 mmol) in deionized water (10 mL), Halloysite (0.30 g, 1.0 mmol) was added to the mixture. The combined solution was allowed to stir for 15 min at room temperature. During the first 10 minutes, the initial light orange color of the palladium acetate solution mixture turned black, indicating the formation of Pd nanoparticles. After 15 min, no more color changes were observed, and the solution was left to rest at room temperature, in open air for 80 minutes. The mixture was then allowed to rest at room temperature for 10 min. The mixture was centrifuged (6000 rpm) and the liquid was pipetted away from the solid residue. The residue was washed with deionized water (2 or 3×15 mL) and isopropyl alcohol (2 or 3×15 mL). The resultant powder was dried at room temperature for 24 h in a desiccator ($Ca_2SO_4$). TEM and XRD were used to characterize and verify the encapsulation of Pd nanoparticles in the halloysite. Pd particles were encapsulated in the halloysite and found decorated on the surface of the halloysite.

As yet another embodiment, a solution of 4.5% $Pd(OAc)_2$ in halloysite showed particles on the inside and outside of the lumen. Specifically, $Pd(OAc)_2$ (0.013 g, 0.06 mmol) in deionized water (10 mL) was prepared in a 50 mL Erlenmeyer flask. A solution of L-sodium ascorbate (1.4 g, 7 mmol) in deionized water (15 mL) was added to the palladium acetate solution followed by addition of solution of citric acid (0.26 g, 1.4 mmol) in deionized water (10 mL), Halloysite (0.30 g, 1.0 mmol) was added to the mixture. The combined solution was allowed to stir for 15 min at room temperature. During the first 10 minutes, the initial light orange color of the palladium acetate solution mixture turned black, indicating the formation of Pd nanoparticles. After 15 min, no more color changes were observed, and the solution was left to rest at room temperature, in open air for 80 minutes. The mixture was then allowed to rest at room temperature for 10 min. The mixture was centrifuged (6000 rpm) and the liquid was pipetted away from the solid residue. The residue was washed with deionized water (2 or 3×15 mL) and isopropyl alcohol (2 or 3×15 mL). The resultant powder was dried at room temperature for 24 h in a desiccator ($Ca_2SO_4$). TEM and XRD were used to characterize and verify the encapsulation of Pd nanoparticles in the halloysite. Pd particles were encapsulated in the halloysite and found decorated on the surface of the halloysite.

Embodiments can also utilize a solvent evaporation method. For example, a solution of Pd(OAc)2 (0.030 g, 0.13 mmol) in deionized water (10 mL) was prepared in a 50 mL Erlenmeyer flask. A solution of L-sodium ascorbate (1.9 g, 10 mmol) in deionized water (15 mL) was added to the palladium acetate solution followed by addition of solution of citric acid (0.12 g, 0.60 mmol) in deionized water (10 mL), Halloysite (0.30 g, 1.0 mmol) was added to the mixture. The combined solution was allowed to stir for 15 min at room temperature. During the first 10 minutes, the initial light orange color of the palladium acetate solution mixture turned black, indicating the formation of Pd nanoparticles. After 15 min, no more color changes were observed, and the solution was left to rest at room temperature, in open air for 80 minutes. The solvent was then evaporated off under constant stir. The black residue was then washed with water (2 or 3×15 mL) and isopropyl alcohol (2 or 3×15 mL). The resultant powder was dried at room temperature for 24 h in a desiccator ($Ca_2SO_4$). TEM was used to characterize and verify the encapsulation of Pd nanoparticles in the halloysite. Some particles were encapsulated. Most of the particles formed clusters on the outside and openings of the tubes.

Embodiments further comprise Cu@Hal Nanoparticles. See, for example, FIG. 17 and FIG. 18. Embodiments can further comprise methods of synthesizing Cu@Hal nanoparticles. For example, to a 125 mL flask equipped with a stir bar was added $CuNO_3$ (0.60 mmol, 0.145 g) and 40 mL of DI water. The mixture was placed under a nitrogen balloon and sonicated for 5 minutes. Trisodium citrate (8.50 mmol, 2.50 g) was dissolved in 10 mL of DI water and added to the flask via syringe, resulting in a transparent deep blue mixture. Next, halloysite (0.60 mmol, 0.176 g) was dispersed in 10 mL of DI water and added to the mixture in the reaction flask and allowed to stir for 10 minutes. The flask was then sonicated for 10 minutes before solution of sodium ascorbate (5.05 mmol, 0.991 g) in 5 ml of DI water was syringed into the flask. The reaction was then stirred while a solution of $NaBH_4$ (0.04 M) was added drop wise to the reaction mixture over 20 minutes. The reaction color gradually changed from blue to black, indicating the formation of copper nanoparticles. After reduction, the mixture was sonicated for 20 minutes then stirred and heated at 40° C. for 45 minutes and finally left to sit at room temperature for 1 hr. The newly synthesized particles were then washed via centrifuge with DI water (3×10 mL) and Isopropanol (2×10 mL) and left in a desiccator to dry.

Embodiments can further comprise Ir nanoparticles. Embodiments can also comprise methods of synthesizing Ir@Hal nanoparticles. For example, halloysite can be added after formation of Ir nanoparticles. See FIG. 20 and FIG. 21, for example. A solution of $IrCl_3$ (180 mg, 0.60 mmol) in deionized water (10 mL) was prepared in a 250 mL Erlenmeyer flask. A solution of trisodium citrate (1760 mg, 6.0 mmol) in deionized water (15 mL) was added to the iridium chloride solution. The mixture was sonicated for 10 mins then placed in an ice bath while continuing to stir as the prepared solution of sodium borohydride (100 mg, 2.4 mmol) in deionized water (30 mL) was added dropwise via pipet over 15 minutes. The combined solution was allowed to stir for 15 min at room temperature. During the first 10 minutes, the initial light yellowish/green color of the iridium chloride solution mixture turned black, indicating the formation of Ir nanoparticles. After 15 min, no more color changes were observed, and the solution was left to rest at room temperature, open to air for 80 min. Halloysite (176 mg, 0.60 mmol) was added to the Ir nanoparticle solution and the colloid mixture was stirred for 15 min. The mixture was then allowed to rest at room temperature for 10 min. The mixture was centrifuged (6000 rpm) and the liquid was decanted away from the solid residue. The residue was washed with deionized water (3×15 mL) and isopropyl alcohol (2×15 mL). The resultant powder was dried at room temperature for 24 h in a desiccator ($CaSO_4$) to afford Ir@Hal as a black powder.

As another example, Ir@Hal can be synthesized in a process wherein halloysite is added from the start. See FIG. 22 and FIG. 23, for example. A solution of $IrCl_3$ (180 mg, 0.60 mmol) in deionized water (10 mL) was prepared in a 250 mL Erlenmeyer flask. A solution of trisodium citrate (1760 mg, 6.0 mmol) in deionized water (15 mL) was added to the iridium chloride solution. Halloysite (176 mg, 0.60 mmol) dispersed in EtOH (30 mL) was added to the Iridium chloride solution and the mixture was stirred and sonicated for 15 min. The mixture was then placed in an ice bath while continuing to stir as the prepared solution of sodium borohydride (100 mg, 2.4 mmol) in deionized water (30 mL) was added dropwise via pipet over 15 minutes. The combined solution was allowed to stir for 15 min at room temperature. During the first 10 minutes, the initial light yellowish/green color of the iridium chloride solution mixture turned black, indicating the formation of Ir nanoparticles. After 15 min, no more color changes were observed, and the solution was left to rest at room temperature, open to air for 80 min. The mixture was sonicated for 10 minutes before washing. The mixture was centrifuged (6000 rpm) and the liquid was decanted away from the solid residue. The residue was washed with deionized water (3×15 mL) and isopropyl alcohol (2×15 mL). The resultant powder was dried at room temperature for 24 h in a desiccator ($CaSO_4$) to afford 15% Ir@Hal as a black powder.

Aspects of the invention are also directed towards methods of using the nanocomposite as described herein for catalyzing coupling reactions to couple two or more compounds. For example, the method can comprise admixing a first compound and a second compound with the nanocomposite as described herein in a solvent for a period of time, wherein the nanocomposite catalyzes the reaction between the first compound and the second compound.

Non-limiting examples of coupling reactions that can be catalyzed by embodiments described herein comprise:
  Negishi coupling, such as between an organohalide and an organozinc compound
  Heck reaction, such as between alkenes and aryl halides
  Suzuki reaction, such as between aryl halides and boronic acids
  Stille reaction, such as between organohalides and organotin compounds
  Hiyama coupling, such as between organohalides and organosilicon compounds
  Sonogashira coupling, such as between aryl halides and alkynes, with copper(I) iodide as a co-catalyst
  The Buchwald-Hartwig amination of an aryl halide with an amine, extended to aryl halide with phenol and thiol
  The Kumada coupling, such as of grignards and aryl or vinyl halides
  The Heck-Matsuda Reaction, such as that of an arenediazonium salt with an alkene
  Ullmann Coupling of an aryl halide, phenol, and aryl amine In embodiments, the method can catalyze a chemical reaction to produce, for example, a biphenyl compound or a substituted aryl.

The skilled artisan will recognize that any suitable solvent can be used, non-limiting examples of which comprise $Cs_2CO_3$, 1,4-dioxane and $C_5CO_3$; aqueous propanol; or water. In embodiments, the solvent can be considered a "green" solvent or "safe" solvent, such as one that does little or no harm to the environment or an individual. For example, embodiments can catalyze a Suzuki-Miyaura cross coupling reaction using water as a solvent. This is an advantage to the industry. As another advantage, embodiments can catalyze reactions at room temperature. These advantages improve upon current techniques, which utilize harmful solvents with high boiling points. Unlike current techniques, embodiments of the invention alleviate concerns about waste disposal and also high energy demands.

The skilled artisan will further recognize that any suitable period of time (for example, about 2, about 4, about 6, about 12, or about 24 hours) and/or temperature (for example, from about 20° C. to about 80° C.) can be utilized. In some embodiments, the temperature is room temperature, for example, about 25° C.

In embodiments, the first compound can comprise an arylboronic acid and the second compound can comprise an aryl halide. The skilled artisan will recognize that coupling reactions of aryl bromides, aryl chlorides, aryl iodides, and aryl pseudohalides (such as triflates and diazonium salts) with various substrates are general methods employed for the formation of C—O bonds, C—H bonds, C—C bonds, and C—N bonds.

Embodiments can comprise Suzuki Coupling reaction. For example, to a 200 mL round bottom flask equipped with a magnetic stir bar and a nitrogen inlet balloon, the aryl halide (12.0 mmol, 1.0 equiv.) and the aryl boronic acid (12.2 mmol 1.2 equiv.) was added. The reaction mixture was flushed with nitrogen followed by the addition of 1-propanol (100 mL) via syringe. The reaction mixture was allowed to stir the for 10 min allowing complete dissolution of all solids. $Cs_2CO_3$ (4.2 g, 13.0 mmol) was dissolved in (20 mL) of DI water, then added to the reaction mixture via syringe. The Pd@Hal (5%) catalyst was dissolved in (20 mL) of DI water; the solution was sonicated (10 min) to ensure dispersion, then added to the reaction mixture via syringe. The reaction flask was sonicated for 10 mins then allowed to stir at room temperature. The reaction progress was monitored by TLC (9:1, hexanes:ethyl acetate). Typically, after the 1 h, reaction was determined to be complete by the consumption of the aryl bromide and the catalyst was recovered by vacuum filtration. The Pd@Hal was rinsed with ethyl acetate (40 mL) followed by DI water (40 mL) and dried in a desiccator ($CaSO_4$). The diluted reaction mixture was transferred to a separatory funnel and the organic phase was removed and filtered through a 2 cm bed of silica gel. The silica gel was rinsed with several portions of (9:1, hexanes:ethyl acetate). The organic portions were combined, and the solvent was removed under vacuum to afford. (2.29 g, 98%). Purity was established by TLC, Melting Point and NMR. All products are known compounds and spectral data were identical to those reported in the literature.

Referring to the Examples, catalyzed Suzuki coupling reactions can be carried out using Pd nanoparticle-haloysite nanocomposite. A Schlenk tube can be charged with Pd-Hal (0.025 mmol), $Cs_2CO_3$ (2.00 equivalents), and a magnetic stirring bar water/propanol (3 mL), 4-bromotoluene (1.0 mmol), and 4-methoxy phenylboronic acid (1.5 mmol) can be added in turn to the Schlenk tube. The Schlenk tube can be stirred for one hour. The mixture can be centrifuged (6000 rpm) and the liquid can be pipetted away from the solid residue. The liquid can be added to ethyl acetate and washed with water. The organic solution can be filtered through a short column of silica gel and the solvent can be removed under reduced pressure. This can afforded the product in 95-98% yield of sufficient purity.

Aspects of the invention are also directed towards methods of using the nanocomposite described herein for hydrogenation of a compound containing carbon-carbon double or triple bonds, such as an alkene (for example, cinnamic acid, diphenylacetylene, isoprene, or α-pinene) or alkyne. In an embodiments, the method comprises admixing the compound with a transition-metal-based nanocomposite described herein, $H_2$, and a solvent (for example, ethanol or hexane) for a period of time at room temperature, wherein the transition-metal-based nanocomposite catalyzes the hydrogenation of the compound.

Aspects of the invention are further directed towards methods comprising recovering the transition metal based nanocomposite as described herein, for example to re-use (i.e., recycle) the nanocomposite. In an embodiments, the reaction mixture can be centrifuged (6000 rpm) and the liquid was decanted from the solid residue. The residue can be washed with deionized water (15 mL) centrifuged and decanted. The washing, centrifugation and decantation process can be repeated with another portion of deionized water (15 mL) and then with isopropyl alcohol (3×15 mL). The resultant powder can be dried at room temperature for 24 h in a desiccator ($Ca_2SO_4$).

EXAMPLES

Examples are provided below to facilitate a more complete understanding of the invention. The following examples illustrate the exemplary modes of making and practicing the invention. However, the scope of the invention is not limited to specific embodiments disclosed in these Examples, which are for purposes of illustration only, since alternative methods can be utilized to obtain similar results.

Example 1

Pd-Halloysite Nanocomposite Materials: Synthesis and Catalytic Activity

We recently have completed studies aimed at the synthesis of a Pd nanoparticle-halloysite nanocomposite material. These studies have demonstrated that the pre-formation of the Pd nanoparticle followed by encapsulation provide the desired Pd nanoparticle-halloysite nanocomposite. As illustrated in FIG. 1, treatment of palladium acetate with sodium ascorbate afforded Pd-nanoparticles of appropriate size for encapsulation in halloysite. FIG. 2 summarizes the conditions employed for optimization of the synthesis of the Pd nanoparticle-halloysite nanocomposite. An aqueous suspension of the synthetic Pd-nanoparticles when added to halloysite using 1:1 molar ratio (FIG. 2, entry 2) furnished the desired Pd nanoparticle-halloysite nanocomposite with a high level of encapusaltion. No externals particle were observed. FIG. 3, shows a TEM image of the encapsulated Pd nanoparticles (black spheres) in the translucent halloysite tubes. Without being bound by theory, conditions for the synthesis of the Pd nanoparticle-halloysite nanocomposite can be further optimized and full characterization of such will be pursued. The viability of this approach has been demonstrated.

Figures 4, 5:
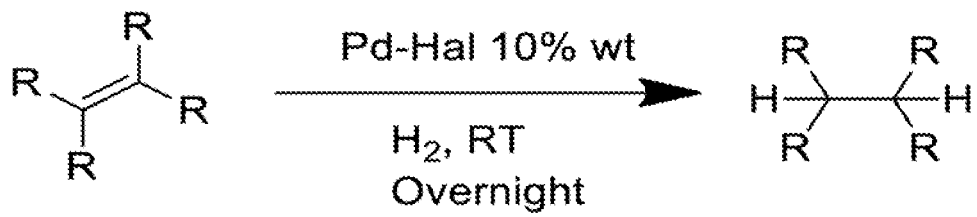
FIG. 4 shows Pd-Halloysite nanocomposite materials are efficient catalyst for hydrogenation of variety of unsaturated compounds.
FIG. 5 shows the Pd-Halloysite Nanocomposite Hydrogentation of Alkenes and Alkynes.

Pd-Halloysite nanocomposite materials are efficient catalysts for hydrogenation of variety of unsaturated compounds. See FIG. 4. The term Pd-Halloysite can refer to imbedded Pd nanoparticles in halloysite. As summarized in FIG. 5, the catalysts give high yields of the corresponding alkane from alkenes and alkynes, the catalyst is tolerant of a variety of functional groups, it is recoverable and recyclable (see FIG. 6) without significant loss of catalytic activity.

Figure 7:
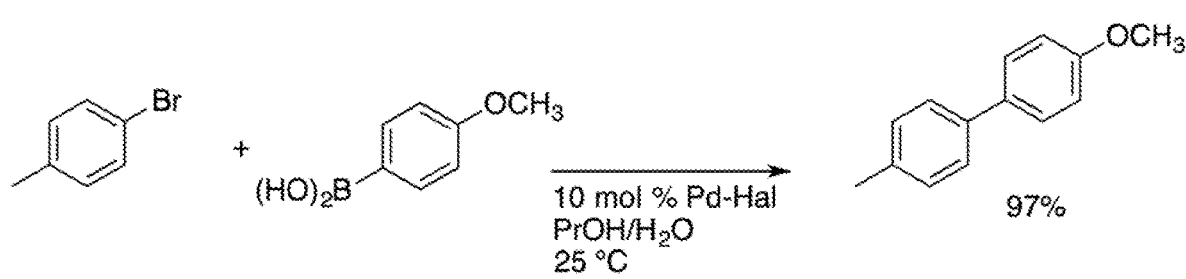
FIG. 7 shows Pd-halloystie catalyzes the Suzuki-Miyaura coupling reaction high yield.

We have also demonstrated that these catalysts are robust and stable under a variety of reaction conditions for the Suzuki-Miyaura cross coupling reactions. As illustrated in FIG. 7, Pd-halloysite catalyzes the Suzuki-Miyaura coupling reaction high yield. It is noteworthy that the reactions proceeds in aqueous propanol at room temperature under argon or nitrogen to give the unsymmetrical biphenyl or substituted aryl compounds with no homo-coupling by-products.

A reproducible method has been developed for preparation of a new transition metal catalyst system based on Pd-halloysite nanocomposites. We have demonstrated that these nanocomposite materials are efficient catalyst for hydrogenation of variety of unsaturated compounds. The catalysts are recoverable and recyclable without significant loss of catalytic activity. Furthermore, we have demonstrated that these catalysts are robust and stable under a variety of reaction conditions for the Suzuki-Miyaura cross coupling reactions.

Example 2

Synthesis of Pd Nanoparticle-Halloysite Nanocomposite
Experimental for the 1:1 Ratio A solution of Pd(OAc)$_2$ (0.014 g, 0.060 mmol) in deionized water (10 mL) was prepared in a 50 mL Erlenmeyer flask. A solution of L-sodium ascorbate (1.9 g, 10 mmol) in deionized water (15 mL) was added to the palladium acetate solution followed by addition of solution of trisodium citrate (0.17 g, 0.60 mmol) in deionized water (10 mL). The combined solution was allowed to stir for 15 min at room temperature. During the first 10 minutes, the initial light orange color of the palladium acetate solution mixture turned black, indicating the formation of Pd nanoparticles. After 15 min, no more color changes were observed and the solution was left to rest at room temperature, in open air for 80 minutes. Halloysite (0.017 g, 0.06 mmol) was added to the Pd nanoparticle solution and the colloid mixture was stirred for 15 min. The mixture was then allowed to rest at room temperature for 10 min. The mixture was centrifuged (6000 rpm) and the liquid was decanted from the solid residue. The residue was washed with deionized water (15 mL) centrifuged and decanted. The washing, centrifugation and decantation process was repeated with another portion of deionized water (15 mL) and then with isopropyl alcohol (2 or 3×15 mL). The resultant powder was dried at room temperature for 24 h in a desiccator (Ca$_2$SO$_4$). TEM and XRD were used to characterize and verify the encapsulation of Pd nanoparticles in the halloysite.

Example 3

Palladium Nanoparticle-Halloysite Nanocomposites. Synthesis, Characterization and Catalytic Activity
Summary Environmentally friendly palladium-halloysite-nanoparticle composites obtained by encapsulation of preformed palladium nanoparticles in raw halloysite nanotubes were used for palladium catalyzed organic reactions. A facile procedure was developed for synthesis of the Pd-halloysite nanocomposite and the material was characterized by XRD and TEM investigations. TEM studies revealed good levels of Pd nanoparticle inclusion within the tubular structure. The new Pd-halloysite nanocomposite material was employed in ligand free catalytic hydrogenation and Suzuki cross-coupling reactions. The Pd-halloysite nanocomposite displayed excellent activity as a hydrogenation catalyst allowing for the reduction of a variety of alkenes and alkynes at ambient temperature and pressures in a variety of solvent systems (EtOH, hexane) including water. The catalyst also showed good recyclability without any loss in activity. In addition, the synthesis of several biphenyl or substituted aryl compounds was achieved using ligand-free Suzuki-Miyaura cross-coupling reactions with aryl bromides and arylboronic acids in high yields. The synthesis and characterization of the Pd-halloysite nanocomposite as well as the scope and limitations of the catalytic activity of this new catalyst system is discussed herein.

Introduction

The Suzuki-Miyaura cross-coupling reaction between an aryl halide and a phenylboronic acid is a common method for the C—C bond forming reaction in modern organic synthesis. Conventionally, these reactions are usually carried out in organic solvents and catalyzed by various soluble Pd/ligand systems. Phosphine-based palladium catalyst systems are widely used, but they can be expensive, potentially toxic, unrecoverable, and sensitive to oxygen and water. The development of heterogeneous catalyst systems has attracted more attention as an effective catalytic method. Typically heterogeneous catalyst systems offer the advantage of a reactive large surface area as well as the potential for recycled use.

The focus of this study was to explore new catalyst systems that could overcome the obstacles associated with traditional homogeneous catalyst systems by exploring the use of metal-nanoparticles composite materials. We show here 1) reduced metal usage by increasing metal surface area through the use of nanoparticles; 2) improved recovery of the transition metal from the reaction media and 3) increased catalyst lifetime (recyclability). In addition, easy recovery methods and catalyst recycling would reduce waste streams and consequently reduce the catalyst cost and disposal. All of that will have positive impact on both the environment and the economy.

Our approach was to explore the use of halloysite nanoscrolls as a catalyst support. Halloysite has a unique combination of aluminosilicate layers that should readily accommodate transition metal nanoparticles. This is due to fact that external silicon oxide surface has an electronegative character, while the internal aluminate surface is electropositive (internal Lewis acid-like). This seems to be an ideal combination for encapsulation of electron-rich nanoparticles of noble transition metals (transition metal catalysts). Herein, we report the synthesis of a new catalyst system consisting of Pd(0) nanoparticles impregnated in halloysite, to form a new nanocomposite material (Pd-Hal). In addition, the application of this new Pd-Hal nanocomposite for Suzuki coupling reactions of aryl bromides and chlorides under environmentally benign conditions has been investigated.

Studies have shown that halloysite has a high biocompatibility and a high thermal stability, making it much safer to work with than typical polymer-based supports. In addition, due to its natural abundance, halloysite is easily obtained, cheap, and even reusable, thus making it a "Green Chemistry" reagent.

The development of halloysite-based nanocomposites for organic synthesis should lead to low cost, environmentally safe "Green Chemistry" methods, for producing important small molecules, including those essential to agrochemical, pharmaceutical and other fine chemical applications.

Synthesis and Characterization of Transition Metal-Nanocomposite Material

As illustrated in FIG. 1, treatment of palladium acetate with sodium ascorbate afforded Pd-nanoparticles of appropriate size for encapsulation in halloysite. An aqueous suspension of the synthetic Pd-nanoparticles when added to halloysite furnished the desired Pd nanoparticle-halloysite nanocomposite. A summary of reaction conditions for encapsulation of the Pd nanoparticles is presented in FIG. 2. FIG. 9, shows a TEM image of the encapsulated Pd nanoparticles (black spheres) in the translucent halloysite tubes.

Conclusions

In conclusion, we have developed a reproducible method for preparation of a new transition metal catalyst system based on Pd-halloysite nanocomposites. We have demonstrated that these nanocomposite materials are efficient catalyst for hydrogenation of variety of unsaturated compounds. The catalysts are recoverable and recyclable without significant loss of catalytic activity. Furthermore, we have demonstrated that these catalysts are robust and stable under a variety of reaction conditions for the Suzuki-Miyaura cross coupling reactions. In this way we have achieved our goal to design cost effective, recyclable, and environmentally friendly prototypical transition metal nanoparticle catalyst. Future work will include the exploration of the catalytic activity of these novel nanocomposite materials.

References Cited In This Example
1. McCoy, M. C&E News, 2010, 88, 35.
2. Gerencsér J., Balázs Á., Dormán G. (2014) Transition Metal-Catalyzed Coupling Reactions in Library Synthesis, in: Patonay T., Kónya K. (eds) Synthesis and Modification of Heterocycles by Metal-Catalyzed Cross-coupling Reactions. Topics in Heterocyclic Chemistry, Vol 45. Springer, Cham, pp. 308-358.
3. Bhanja, P.; Bhaumik, A., Functionalized Porous Nanomaterials as Efficient Heterogeneous Catalyst for Eco-Friendly Organic Transformations. *J. Nanosci. Nanotechnol.* 2016, 16 (9), 9050-9062.
4. Sinha Ray S, Okamoto M. Polymer/layered silicate nanocomposites:a review from preparation to processing. *Prog Polym Sci.* 2003, 28, 1539-641.
5. Moniruzzaman M, Winey K I. Polymer nanocomposites containing carbon nanotubes. *Macromolecules* 2006, 39, 5194-205.
6. Byrne M T, Gun'ko Y K. Recent advances in research on carbon nanotube-polymer composites. *Adv Mater* 2010, 22, 1672-88.
7. Joussein E, Petit S, Churchman J, Theng B, Righi D, Delvaux B. Halloysite clay minerals—a review. *Clay Miner* 2005, 40, 383-426.
8. Abdullayev E, Lvov Y. Halloysite clay nanotubes as a ceramic "Skeleton" for functional biopolymer composites with sustained drug release. *J Mater Chem B* 2013, 1, 2894-903.
9. Hendricks S B. Crystal structures of the clay mineral hydrates. *Nature* 1938, 142, 38.
10. Hamdi, Jumanah; Trudell, Mark L. (work in progress).
11. Suzuki-Miyaura Cross-Coupling Reactions Mediated By Palladium/Imidazolium Salt Systems. Grasa, G. A.; Viciu, M. S.; Huang, J.; Zhang, C.; Trudell, M. L.; Nolan, S. P. *Organometallics*, 2002, 21, 2866-2873.
12. Palladium-Bisimidazolylidene Complexes as Catalysts for Efficient Suzuki Cross-Coupling Reactions of Aryl Chlorides with Arylboronic Acids. Zhang, C.; Trudell, M. L. *Tetrahedron Lett.* 2000, 41, 595-598.
13. Miao, L.; DiMaggio, S.; Shu, H.; Trudell., M. L. Enantioselective Synthesis of Both Enantiomers of Noranabasamine *Org. Lett.* 2009, 11, 1579-1582.
14. Apsunde, T.; Trudell, M. L. Microwave-assisted iridium catalyzed synthesis of nicotine and anabasine derivatives. *Synthesis,* 2013 45, 2120-2124.
15. Apsunde, T.; Trudell, M. L. Solvent-free, base-free, microwave-mediated iridium catalyzed N-alkylation of amides with alcohols. *Synthesis,* 2014, 46, 230-234.
16. Sawoo, S.; Srimani, D.; Dutta, P.; Lahiri, R.; Sarkar, A. Size controlled synthesis of Pd nanoparticles and application in C—C-coupling reactions. *Tetrahedron* 2009, 4367.

Example 4

Transition metal catalyzed organic reactions have significantly enhanced the synthetic capabilities of modern organic chemistry to access complex structures rapidly and efficiently. Many pharmaceutical compounds and agrochemicals are synthesized using at least one if not more transition metal catalyzed reactions in the overall synthetic sequence. These reactions have become widely used in the drug discovery process as well as the large scale synthesis of pharmaceutical ingredients. For example, BASF prepares 3000-5000 tons/year of menthol using transition metal catalysis as the key step in the synthesis.[1] Blockbuster drugs such as Crestor® (cholesterol lowering) Tamiflu® (antiviral) and Abillify® (antidepressant), each with annual sales revenue over $500 million dollars, are prepared via transition metal catalyzed organic reactions.[2]

Transition metal catalyzed organic reactions have become indispensable to industry for the synthesis of fine chemicals and pharmaceutical ingredients; however, there remains numerous challenges to industrial scale production using transition metal catalyzed organic reactions. These challenges include 1) the costs of transition metal catalysts and the cost of associated ligand systems; 2) availability of noble transition metals such as copper (Cu), ruthenium (Ru), rhodium (Rh), palladium (Pd), Iridium (Ir), platinum (Pt) and gold (Au); and 3) the ability to recover/recycle catalysts. Thus, aspects of the invention are directed towards development of new transition metal nanocomposite materials that can serve as catalyst alternatives to traditional transition metal-ligand systems for current industrial applications. Without wishing to be bound by theory, a nanocomposite material will have greater stability than traditional metal-ligand systems, allowing for 1) reduced metal usage due to increased metal surface area of nanoparticles, 2) better recovery of the transition metal from the reaction media and 3) increased catalyst lifetime (recyclability). Improvement of catalyst performance in any one of these areas by transition metal nanocomposite materials will positively affect commercial and environmental aspects of the industrial process. Improved catalytic systems would result in reduced production costs for pharmaceutical ingredients, and thus may ultimately lead to lower drug prices. In addition, easy recovery methods and catalyst recycling would reduce waste streams associated catalyst removal and regeneration. While also having a significant environmental impact, this too would reduce production costs thus benefiting the individual consumer. Overall, improved catalyst would have far reaching effects on many social and economic levels.

Polymer nanocomposites that contain organic and inorganic additives have attracted extensive interest due to the unique characteristics of nanoparticles, including their large surface area, high surface reactivity, and relatively low cost.[3,4] Traditional additives include black carbon, graphite, silica, and silicate; these materials can enhance numerous polymer properties, generating increased mechanical properties, improved thermal resistance, and reduced gas permeability.[5,6] Carbon nanotubes and boron nitride nanotubes have been the most widely studied materials; however, both of these materials are technologically demanding to produce in bulk, making them expensive.[6]

On the other hand, halloysite nanoscrolls offer an inexpensive, low-tech alternative that is morphologically similar to multi-walled carbon nanotubes. The hydrated polymorph of halloysite is a 1:1 aluminosilicate clay, belonging to the kaolin group of clays.[7]

Raw halloysite is mined from natural deposits. This material is usually white in color but is also sometimes slight red. The stone-like raw halloysite is easily ground into powder. The molecular formula for halloysite is $Al_2Si_2O_5(OH)_4 \cdot nH_2O$ (FIG. 8) and similar to kaolinite with water molecules.[8]

Figure 8:
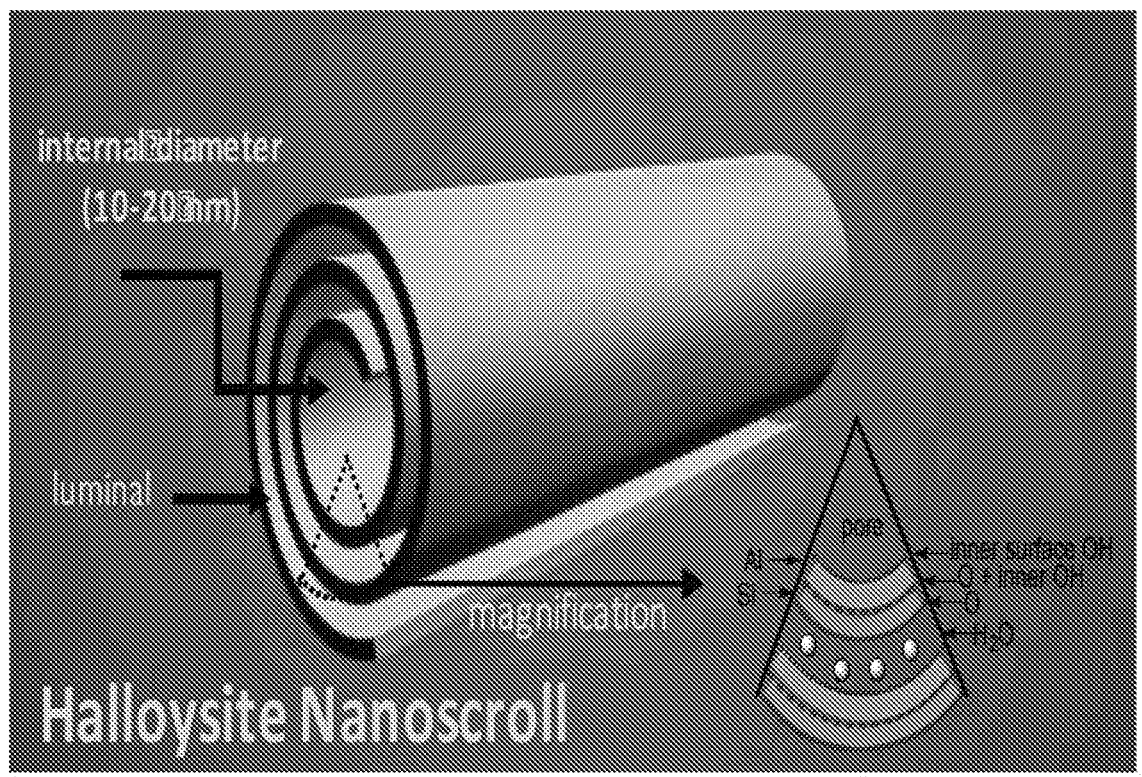
FIG. 8 shows schematic halloysite nanoscroll, and schematic halloysite crystalline structure. Raw halloysite is mined from natural deposits. This material is usually white in color but is also sometimes slight red. The stone-like raw halloysite is easily ground into powder. The molecular formula for halloysite is $Al_2Si_2O_5(OH)_4 \cdot nH_2O$ and similar to kaolinite with water molecules.
Figure 10:
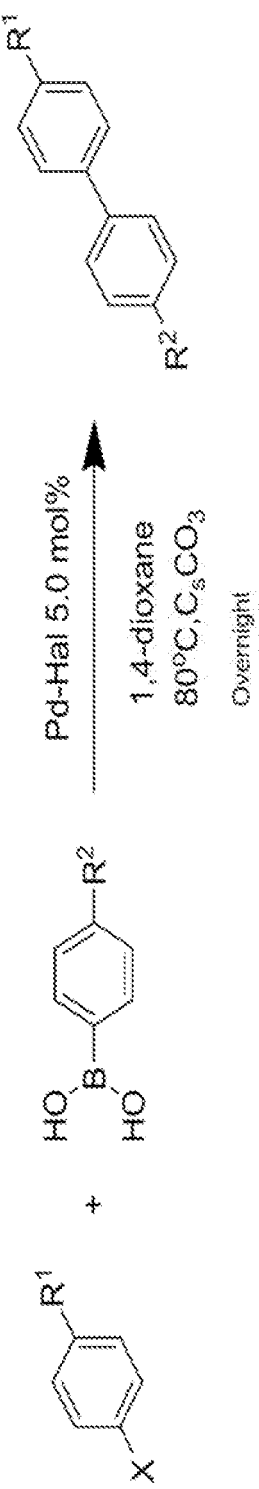

As illustrated in FIG. 8, halloysite nanoscrolls are novel natural nanomaterials with a unique combination of aluminosilicate layers. As a result of the layering the external silicon oxide surface has an electronegative character, while the internal aluminate surface of the nanoscroll pore is electropositive (Lewis acid-like).[7] Therefore, without wishing to be bound by theory, it is possible to exploit the Lewis acid nature of the inner nanoscroll surface to encapsulate electron-rich nanoparticles of noble transition metals.

When n=2 in the molecular formula of halloysite, the halloysite nanoscrolls are in a hydrated state with one layer of water in the interlayer spaces with an interlayer distance of 7-10 nm.[9] Since aluminosilicate chemistry is generally non-toxic and is very durable, halloysite has many advantages for use in classical chemical processes. Studies have shown that halloysite has a high biocompatibility and a high thermal stability, making it much safer to work with than typical polymer-based supports.[5] In addition, due to its natural abundance, halloysite is easily obtained, cheap, and even reusable[7,8], thus making it a "Green Chemistry" reagent.

The development of halloysite-based nanocomposites for organic synthesis should lead to low cost, environmentally safe "Green Chemistry" methods, for producing important small molecules, including those essential to agrochemical, pharmaceutical and other fine chemical applications. While the utility of nanomaterials for organic reactions has been demonstrated in other systems that possess nanopolymers, very little synthetic chemistry has been explored using halloysite-nanocomposite materials.

The objectives of the experiments include 1) to prepare and characterize a novel transition metal nanoparticle-halloysite nanocomposite materials and 2) demonstrate the efficacy of these new materials for heterogeneous transition metal catalyzed organic reactions.

Objective 1: Synthesis and Characterization of Transition Metal-Nanocomposite Material.

The Lewis acid environment of the internal surface of the halloysite scroll is ideally suited for encapsulation of noble transition metal nanoparticles. Several transition metal ions ($Cu^{+2}$, $Fe^{+3}$)[8] have been reported as encapsulated in halloysite, but unlike embodiments of the invention as described herein, transition metal nanoparticles (such as Au, Ag, and Ru) have not been reported. Moreover, these transition metals have little application for catalysis of organic reactions. More attractive transition metals for organic reaction catalysis would be copper (Cu), palladium (Pd), rhodium (Rh) and iridium (Ir), for example. Encapsulation of these metals as nanoparticles is new and highly innovative. As an example, we have focused on the synthesis of a Pd nanoparticle-halloysite nanocomposite.

There are two possible approaches to synthesize a Pd nanoparticle-halloysite nanocomposite material. The first approach would be to form Pd-nanoparticles and then encapsulate the particle in the scroll of the halloysite. This approach would require control of the nanoparticle size so as not to be make them too big to fit into the tubular volume of the scroll. Large particles and would then adhere to the outer walls the halloysite, rendering the nanoparticle more exposed.

The second approach would be to form the nanoparticle inside the scroll. This approach would require the delivery of particle forming reagents to the internal tube of halloysite prior to nanoparticle formation.

Of the two approaches the first approach is experimentally easier to execute as long as the desired nanoparticle size can be achieved. Without wishing to be bound by theory, the second approach will give uniform encapsulation if the particle forming regents can be delivered selectivity and sequentially to form the nanoparticle internally.

Studies aimed at the synthesis of a Pd nanoparticle-halloysite nanocomposite material have been completed.[10] These studies have demonstrated that the pre-formation the Pd nanoparticle followed by encapsulation provide the desired Pd nanoparticle-halloysite nanocomposite. As illustrated in FIG. 1, treatment of palladium acetate with sodium ascorbate afforded Pd-nanoparticles of appropriate size for encapsulation in halloysite. An aqueous suspension of the synthetic Pd-nanoparticles when added to halloysite furnished the desired Pd nanoparticle-halloysite nanocomposite. FIG. 3 shows a TEM image of the encapsulated Pd nanoparticles (black spheres) in the translucent halloysite tubes. We will further optimize conditions for the synthesis of the Pd nanoparticle-halloysite nanocomposite and further characterize the nanocomposite. These studies have demonstrated the viability of this approach.[10]

Encouraged by this success, the synthesis of Pd-halloysite nanocomposites will be further optimized, focusing on optimization of particle size and particle loading. As part of this objective, we will synthesize new transition-metal nanoparticle-halloysite nanocomposite materials based upon encapsulation of Cu, Ru, Rh and Ir nanoparticles.

Objective 2: Application of Transition-Metal Nanoparticle-Halloysite Nanocomposite for as Catalysts for Organic Reactions.

Figure 11:
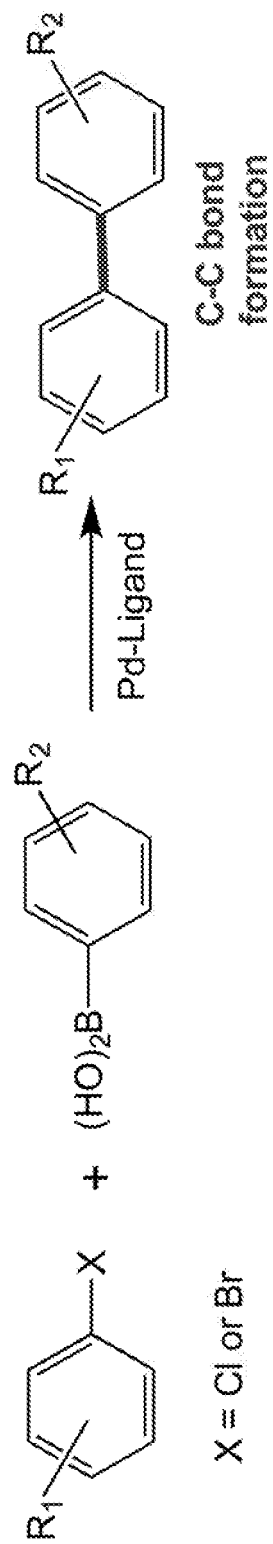
FIG. 11 shows Pd-Ligand Suzuki cross-coupling C—C bond formation.
Figure 12:
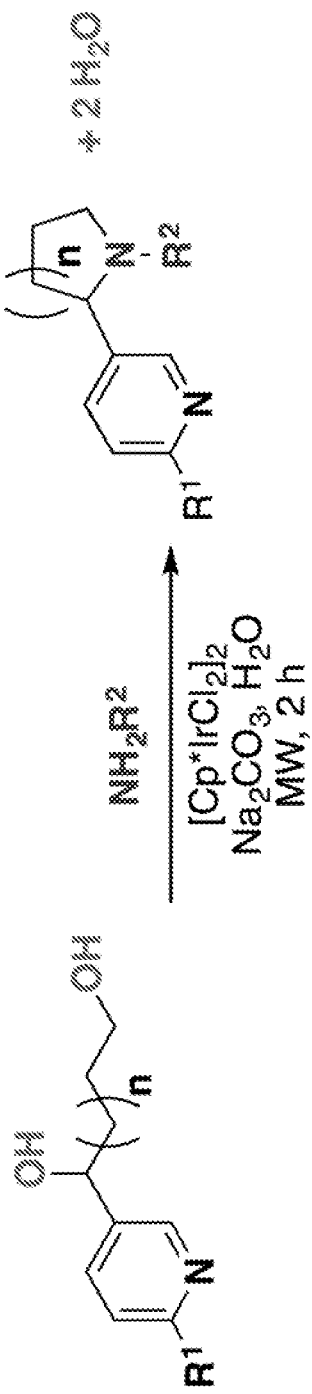
FIG. 12 shows IR-catalyzed C—N bond forming reactions.

The second objective of the study is to demonstrate that transition metal nanoparticle-halloysite nanocomposites can be employed as catalysts for organic reactions. Previous studies in the inventors laboratories have been directed toward the development of new "Green" catalytic methods for the formation of C—O bonds, C—H bonds, C—C bonds (FIG. 11)[11,12] and C—N bonds (FIG. 12).[13-15] using transition metal ligand systems.

The formation of the C—O bond, C—H bond, C—C bond and C—N bond are important reactions for the preparation of pharmaceutical ingredients and agrochemicals. Previous advances from the inventors laboratories include the development of Pd-ligand systems capable of catalyzing Suzuki cross-coupling reactions with aryl chlorides. This was a significant advancement given that aryl chlorides, although much cheaper than aryl bromides, are significantly less reactive. This advancement greatly reduced the cost of Suzuki bond forming reactions that previously employed aryl bromide precursors. Recently, the inventors have also developed iridium (Ir), catalyzed N-alkylation reactions for the formation of C—N bonds using alcohols as environmentally benign equivalents of alkyl halides.[15] These reactions work on the hydrogen borrowing concept which involves generation of only water as a by-product.

However, despite the success of the Pd catalyzed Suzuki reaction and the Ir-catalyzed N-alkylation reaction, there remains a need for the development of new robust catalyst systems with wide substrate tolerance that exploit "Green" reaction conditions. Our interest in catalytic systems for the formation of C—O bonds, C—C bonds, and C—N bonds has prompted investigation of the application of transition-metal nanoparticle-halloysite nanocomposite for broad-scale use under "Green" reactions conditions. To this end, it is of interest to explore transition-metal nanoparticle-halloysite nanocomposites as catalysts for the Suzuki cross-coupling reaction and N-alkylation reactions.

Figure 13:
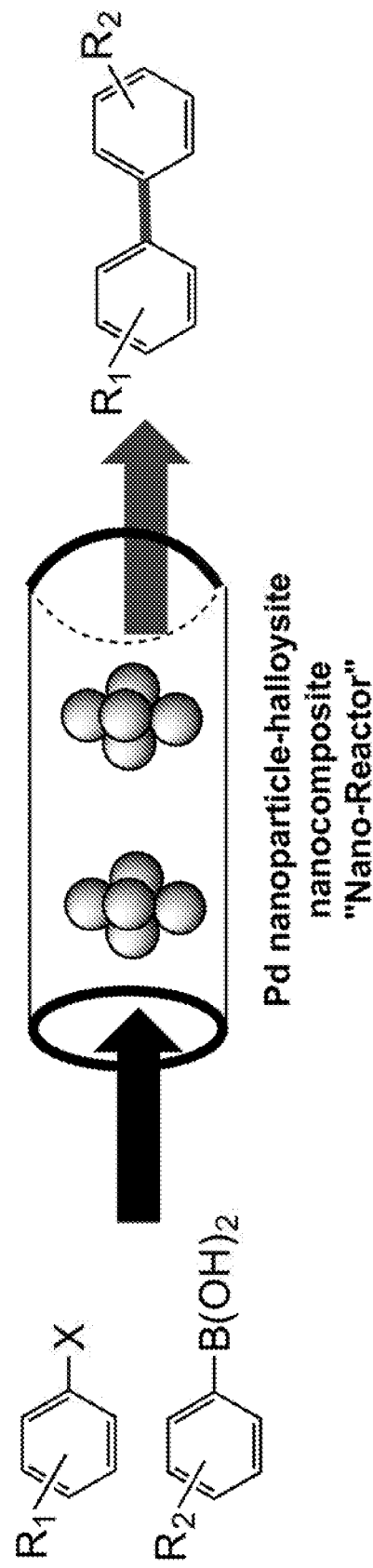
FIG. 13 shows Pd nanoparticle-halloysite nanocomposite "nano-reactor" for the Suzuki reaction.

Pd-Nanoparticles have been successfully employed for Suzuki-cross coupling reactions as well as other related-C—C bond forming reactions.[16] However as "naked" nanoparticles these materials have a limited catalytic lifetime and are not generally recyclable materials. Without wishing to be bound by theory, a transition-metal nanoparticle-halloysite nanocomposite will lead to a stabilized catalyst system that can have longer lived catalyst activity, afford catalytic activity in aqueous and/or aerobic environments and provide better recovery of costly transition metals. In addition, transition-metal nanoparticle-halloysite nanocomposites will avoid the use of expensive ligands, allowing for ligand free catalysis. To this end we will explore the catalytic efficacy of the Pd nanoparticle-halloysite nanocomposite.[10] Pd Nanoparticles imbedded in the empty tubular lumenal of the nanoscroll, will be less susceptible to external reactants such as $O_2$ and water and should provide a more robust system capable of catalyst recycling. Deposition of Pd nanoparticles on the internal surface of halloysite has not been explored and represents a significant innovation in this area. Without wishing to be bound by theory, Pd nanoparticle-halloysite nanocomposite will perform as "nano-reactors" for C—C bond formation (see FIG. 13).

Figure 14:
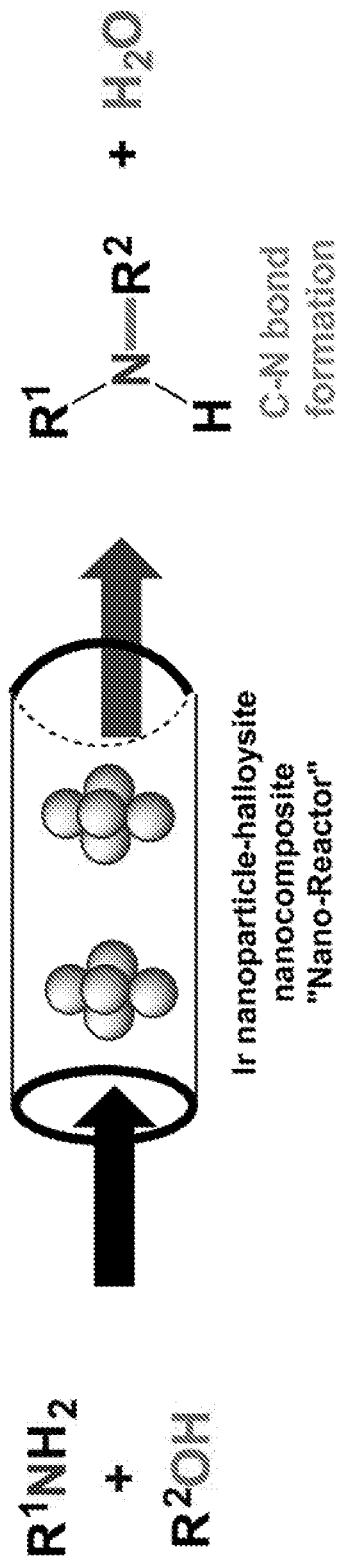
FIG. 14 shows Ir nanoparticle-halloysite (Ir@Hal) nanocomposite "nano-reactor" for N-alkylation.

In similar fashion, an Ir nanoparticle-halloysite nanocomposite will prepared and demonstrated to be a nano-reactor for C—N bond formation (FIG. 14).

In summary, the development of transition metal nanoparticle-halloysite nanocomposite will have wide application to the catalysis of a broad spectrum of organic reactions.

References Cites In This Example
1. McCoy, M. C&E News, 2010, 88, 35.
2. Gerencsér Balázs Á., Dormán G. (2014) Transition Metal-Catalyzed Coupling Reactions in Library Synthesis. In: Patonay T Kónya K. (eds) Synthesis and Modification of Heterocycles by Metal-Catalyzed Cross-coupling Reactions. Topics in Heterocyclic Chemistry, Vol 45. Springer, Cham, pp. 308-358.
3. Bhanja, P.; Bhaumik, A., Functionalized Porous Nanomaterials as Efficient Heterogeneous Catalyst for Eco-Friendly Organic Transformations. *J Nanosci. Nanotechnol.* 2016, 16 (9), 9050-9062.
4. Sinha Ray S, Okamoto M. Polymer/layered silicate nanocomposites:a review from preparation to processing. *Prog Polym Sci.* 2003, 28, 1539-641.
5. Moniruzzaman M, Winey K I. Polymer nanocomposites containing carbon nanotubes. *Macromolecules* 2006, 39, 5194-205.
6. Byrne M T, Gun'ko Y K. Recent advances in research on carbon nanotube-polymer composites. *Adv Mater* 2010, 22, 1672-88.
7. Joussein E, Petit S, Churchman J, Theng B, Righi D, Delvaux B. Halloysite clay minerals—a review. *Clay Miner* 2005, 40, 383-426.
8. Abdullayev E, Lvov Y. Halloysite clay nanotubes as a ceramic "Skeleton" for functional biopolymer composites with sustained drug release. *J Mater Chem B* 2013, 1, 2894-903.
9. Hendricks S B. Crystal structures of the clay mineral hydrates. *Nature* 1938, 142, 38.
10. Hamdi, Jumanah; Trudell, Mark L. (work in progress).
11. Suzuki-Miyaura Cross-Coupling Reactions Mediated By Palladium/Imidazolium Salt Systems. Grasa, G. A.; Viciu, M. S.; Huang, J.; Zhang, C.; Trudell, M. L.; Nolan, S. P. *Organometallics,* 2002, 21, 2866-2873.
12. Palladium-Bisimidazolylidene Complexes as Catalysts for Efficient Suzuki Cross-Coupling Reactions of Aryl Chlorides with Arylboronic Acids. Zhang, C.; Trudell, M. L. *Tetrahedron Lett.* 2000, 41, 595-598.
13. Miao, L.; DiMaggio, S.; Shu, H.; Trudell., M. L. Enantioselective Synthesis of Both Enantiomers of Noranabasamine *Org. Lett.* 2009, 11, 1579-1582.
14. Apsunde, T.; Trudell, M. L. Microwave-assisted iridium catalyzed synthesis of nicotine and anabasine derivatives. *Synthesis,* 2013 45, 2120-2124.
15. Apsunde, T.; Trudell, M. L. Solvent-free, base-free, microwave-mediated iridium catalyzed N-alkylation of amides with alcohols. *Synthesis,* 2014, 46, 230-234.
16. Sawoo, S.; Srimani, D.; Dutta, P.; Lahiri, R.; Sarkar, A. Size controlled synthesis of Pd nanoparticles and application in C—C-coupling reactions. *Tetrahedron* 2009, 4367.

Example 5

Suzuki Cross-Coupling Reactions

To a 50 mL round bottomed flask equipped with a magnetic stir bar and a nitrogen inlet balloon was added the arylbromide (5.0 mmol), the aryl boronic acid (5.5 mmol). The reaction mixture was flushed with another nitrogen balloon followed by the addition of 1-propanol (10.0 mL) via syringe. The reaction mixture was allowed to stir the for 5 min allowing complete dissolution of all solids. Cs2CO3 (2.11 g, 6.50 mmol) was dissolved in (2.0 mL) of DI water, flushed with nitrogen then added to the reaction mixture via syringe. Pd-Hal (0.20 g, 10% mmol) catalyst was dissolved in (2.0 mL) of DI water. The pd-hal solution was sonicated, flushed with nitrogen then added to the reaction mixture via syringe. The reaction was allowed to stir at room temp under a nitrogen environment until complete (~1 h). The reaction progress was monitored by TLC (9:1, hexanes:ethyl acetate). After the 1-hour mark, the pd-hal catalyst was recovered by vacuum filtration. The pd-hal was rinsed using (10 mL) of ethyl acetate followed by DI water (10 mL). The Diluted reaction mixture was transferred to a separatory funnel to separate the organic phase out from the aqueous phase. The organic phase was filtered through a 2 cm bed of silica gel using a Buchner funnel into a 125 mL filter flask. After filtration, the silica was rinsed with several portions of (9:1, hexanes:ethyl acetate). The solvent was removed under vacuum to afford the purified biphenyl as a white solid (93-98%). Purity was verified via TLC, NMR Example 6

Halloysite Added after Formation of Ir Nanoparticles: Synthesis of Ir@Hal (Procedure A)

Figure 20:
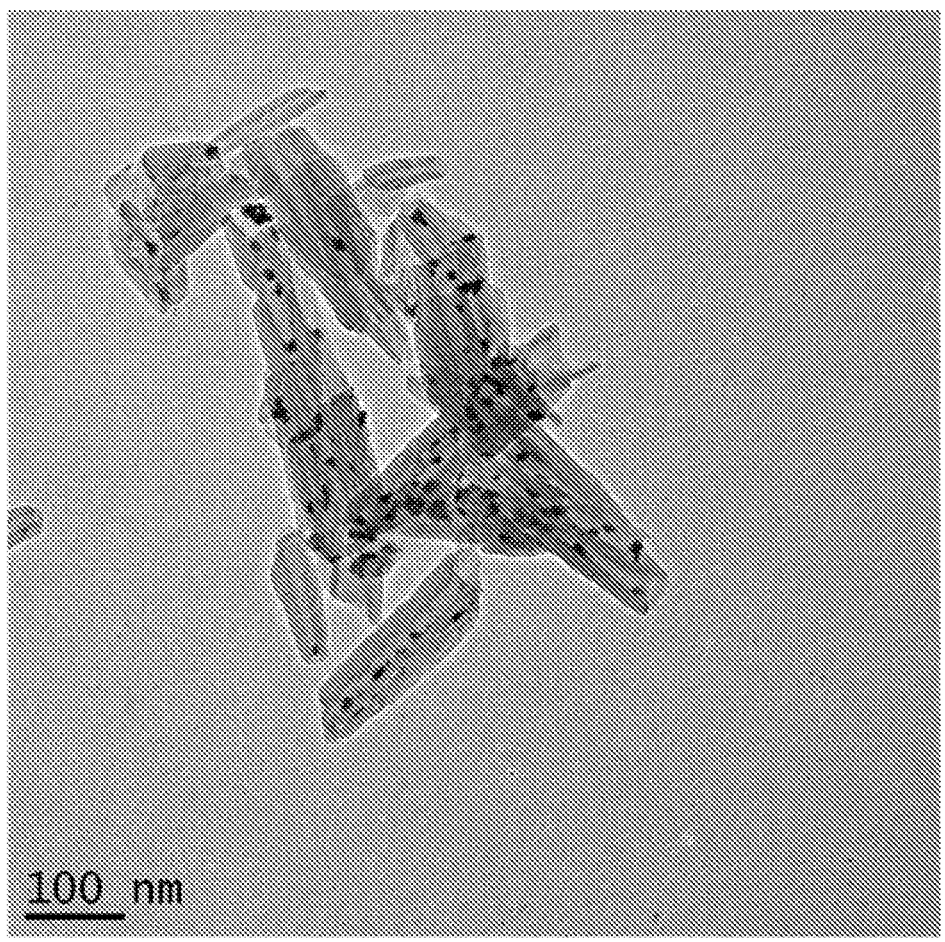
FIG. 20 shows Ir@Hal A1.
Figure 21:
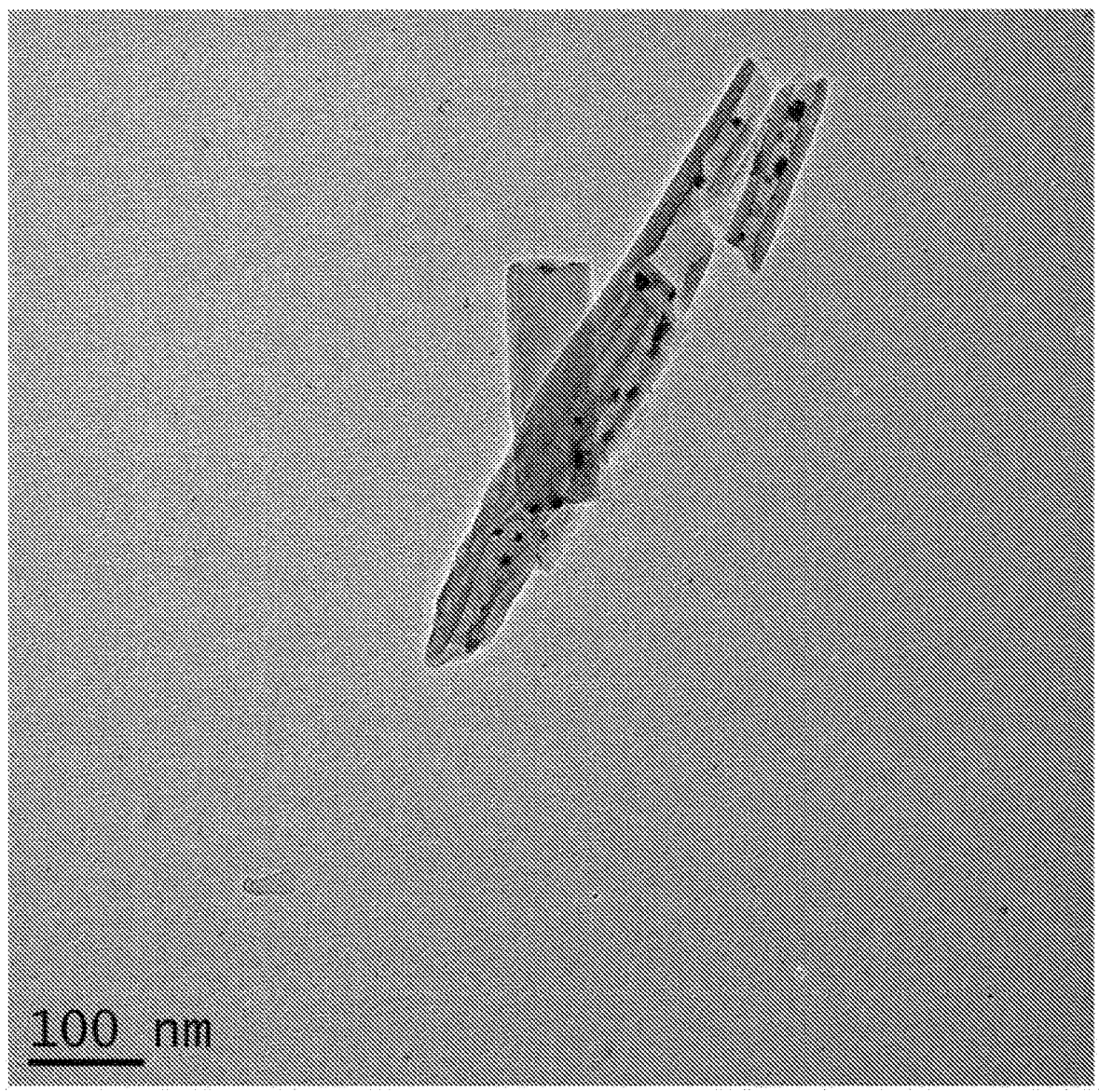
FIG. 21 shows Ir@Hal A2.

See FIG. 20 and FIG. 21, for example.

A solution of IrCl$_3$ (180 mg, 0.60 mmol) in deionized water (10 mL) was prepared in a 250 mL Erlenmeyer flask. A solution of trisodium citrate (1760 mg, 6.0 mmol) in deionized water (15 mL) was added to the iridium chloride solution. The mixture was sonicated for 10 mins then placed in an ice bath while continuing to stir as the prepared solution of sodium borohydride (100 mg, 2.4 mmol) in deionized water (30 mL) was added dropwise via pipet over 15 minutes. The combined solution was allowed to stir for 15 min at room temperature. During the first 10 minutes, the initial light yellowish/green color of the iridium chloride solution mixture turned black, indicating the formation of Ir nanoparticles. After 15 min, no more color changes were observed, and the solution was left to rest at room temperature, open to air for 80 min. Halloysite (176 mg, 0.60 mmol) was added to the Ir nanoparticle solution and the colloid mixture was stirred for 15 min. The mixture was then allowed to rest at room temperature for 10 min. The mixture was centrifuged (6000 rpm) and the liquid was decanted away from the solid residue. The residue was washed with deionized water (3×15 mL) and isopropyl alcohol (2×15 mL). The resultant powder was dried at room temperature for 24 h in a desiccator (CaSO$_4$) to afford Ir@Hal as a black powder.

Halloysite Added from the Start: Alternate Synthesis of Ir@Hal (Procedure B)

Figure 22:
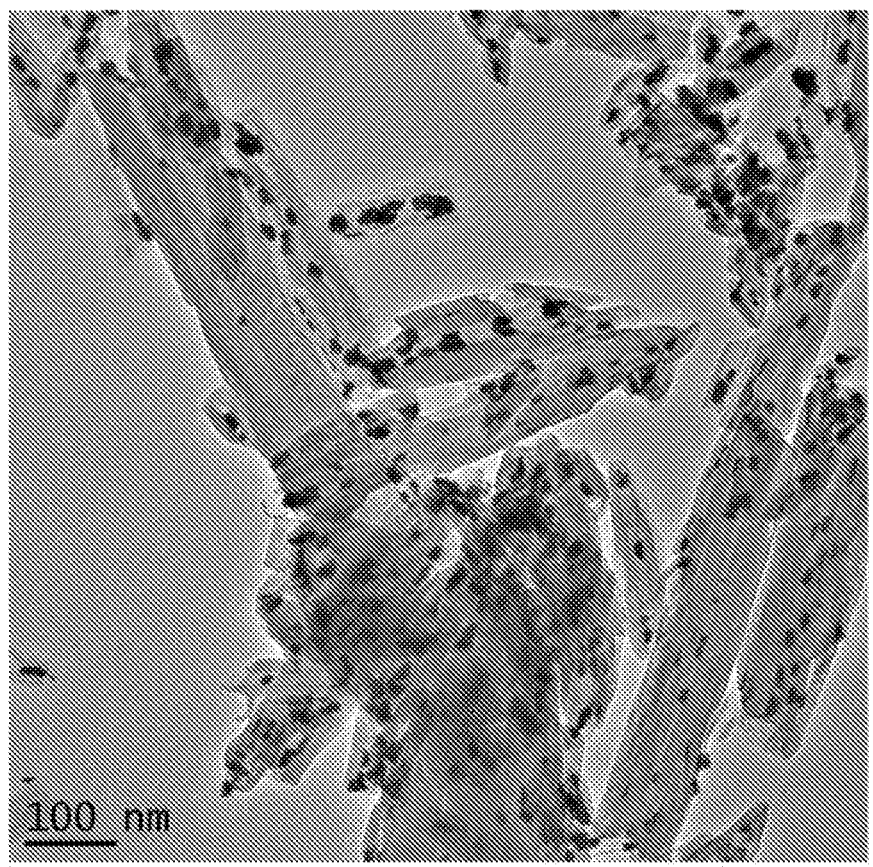
FIG. 22 shows Ir@Hal B1.
Figure 23:
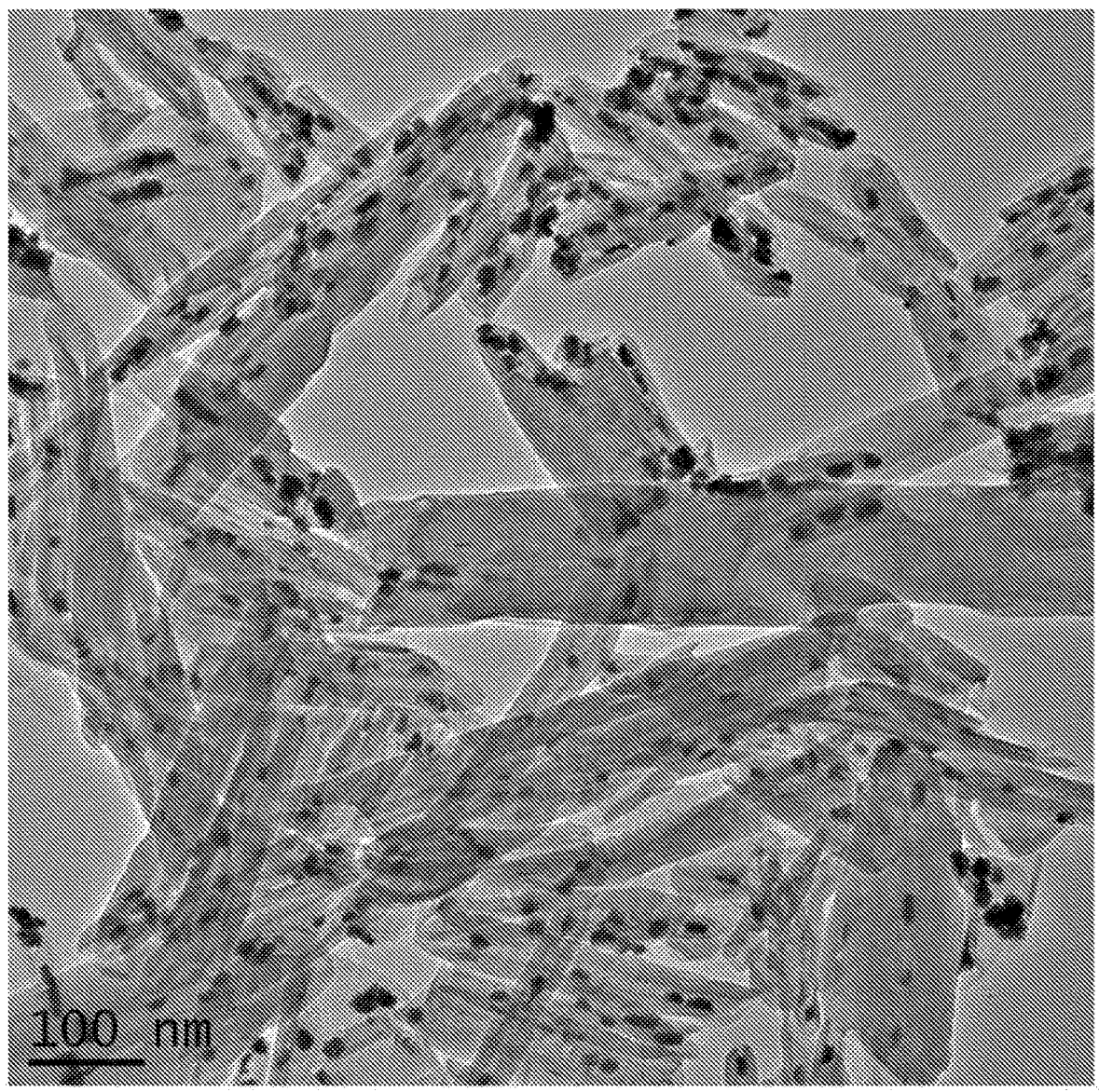
FIG. 23 shows Ir@Hal B2.

See FIG. 22 and FIG. 23

A solution of IrCl$_3$ (180 mg, 0.60 mmol) in deionized water (10 mL) was prepared in a 250 mL Erlenmeyer flask. A solution of trisodium citrate (1760 mg, 6.0 mmol) in deionized water (15 mL) was added to the iridium chloride solution. Halloysite (176 mg, 0.60 mmol) dispersed in EtOH (30 mL) was added to the Iridium chloride solution and the mixture was stirred and sonicated for 15 min. The mixture was then placed in an ice bath while continuing to stir as the prepared solution of sodium borohydride (100 mg, 2.4 mmol) in deionized water (30 mL) was added dropwise via pipet over 15 minutes. The combined solution was allowed to stir for 15 min at room temperature. During the first 10 minutes, the initial light yellowish/green color of the iridium chloride solution mixture turned black, indicating the formation of Ir nanoparticles. After 15 min, no more color changes were observed, and the solution was left to rest at room temperature, open to air for 80 min. The mixture was sonicated for 10 minutes before washing. The mixture was centrifuged (6000 rpm) and the liquid was decanted away from the solid residue. The residue was washed with deionized water (3×15 mL) and isopropyl alcohol (2×15 mL). The resultant powder was dried at room temperature for 24 h in a desiccator (CaSO$_4$) to afford 15% Ir@Hal as a black powder.

Example 7

Synthesis of Cu@Hal Nanoparticles

To a 125 mL flask equipped with a stir bar was added CuNO3 (0.60 mmol, 0.145 g) and 40 mL of DI water. The mixture was placed under a nitrogen balloon and sonicated for 5 minutes. Trisodium citrate (8.50 mmol, 2.50 g) was dissolved in 10 mL of DI water and added to the flask via syringe, resulting in a transparent deep blue mixture. Next, halloysite (0.60 mmol, 0.176 g) was dispersed in 10 mL of DI water and added to the mixture in the reaction flask and allowed to stir for 10 minutes. The flask was then sonicated for 10 minutes before solution of sodium ascorbate (5.05 mmol, 0.991 g) in 5 ml of DI water was syringed into the flask. The reaction was then stirred while a solution of NaBH4 (0.04 M) was added drop wise to the reaction mixture over 20 minutes. The reaction color gradually changed from blue to black, indicating the formation of copper nanoparticles. After reduction, the mixture was sonicated for 20 minutes then stirred and heated at 40° C. for 45 minutes and finally left to sit at room temperature for 1 hr. The newly synthesized particles were then washed via centrifuge with DI water (3×10 mL) and Isopropanol (2×10 mL) and left in a desiccator to dry.

Figure 17:
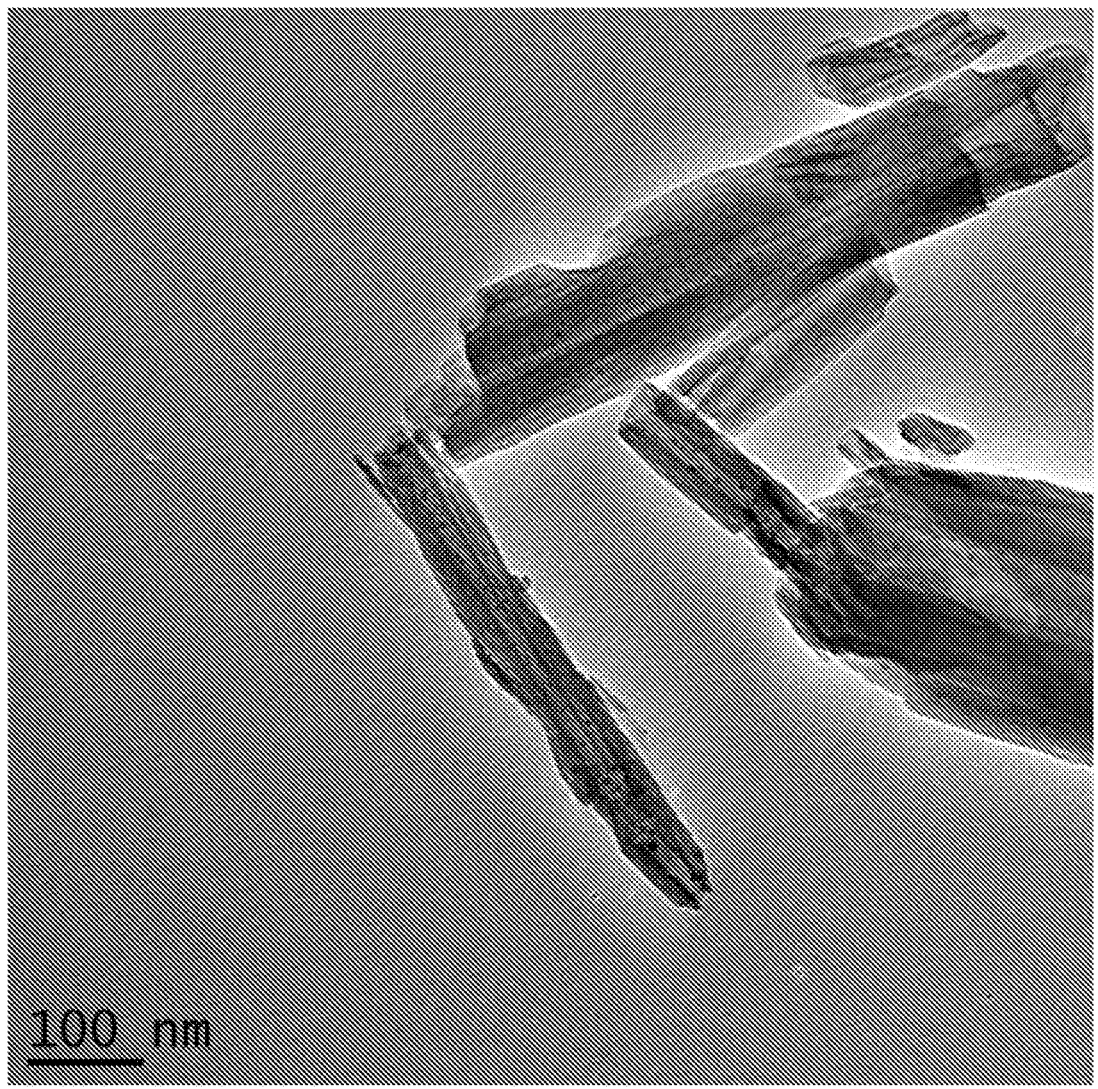
FIG. 17 shows Cu@Hal A1.
Figure 18:
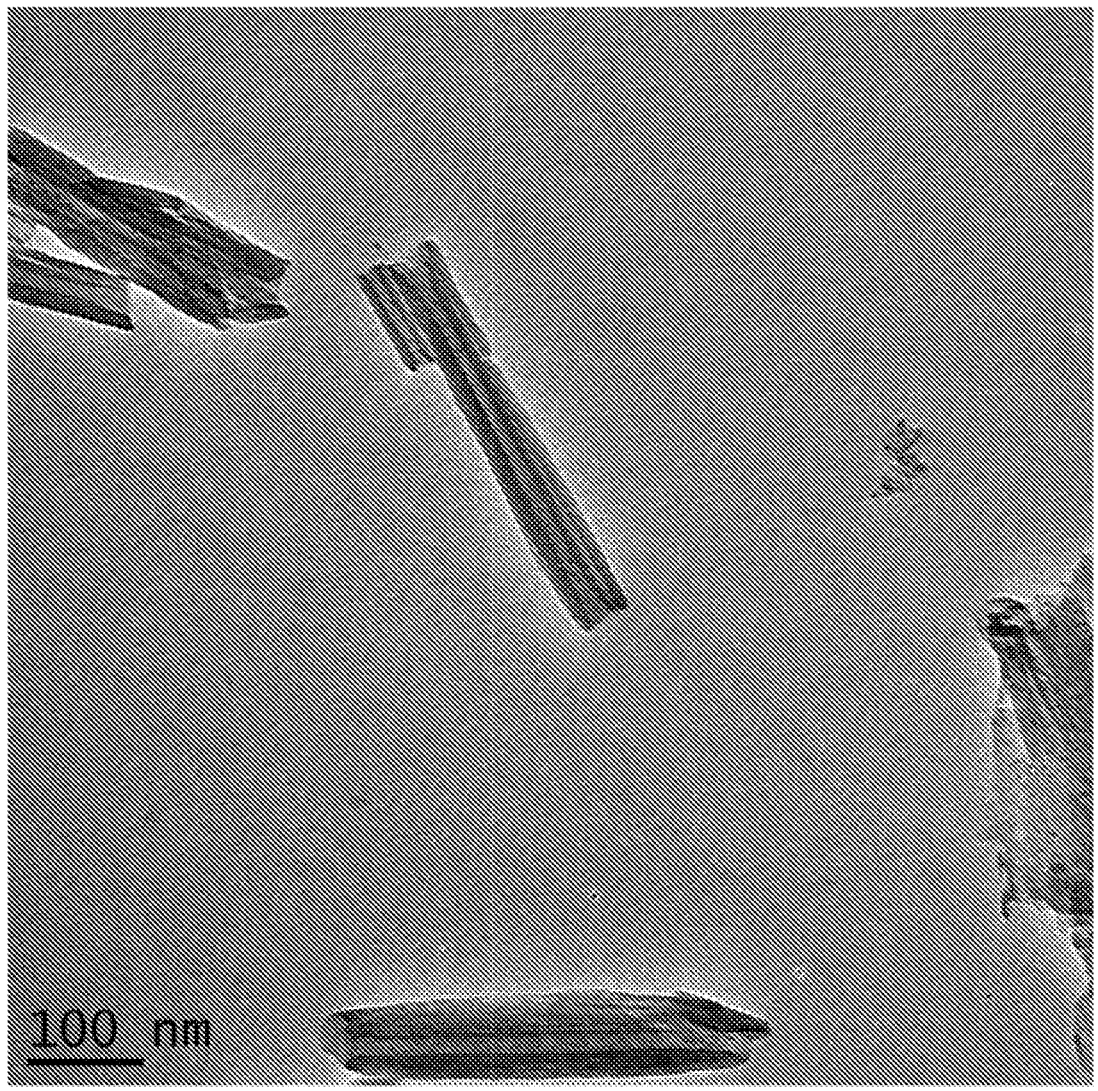
FIG. 18 shows Cu@Hal A2.
Figure 19:
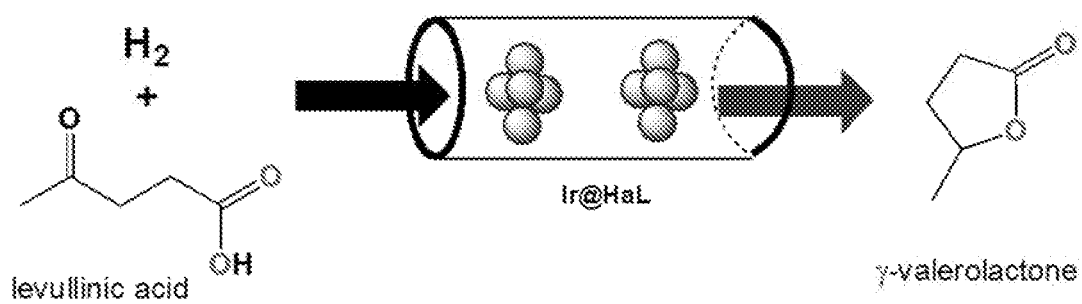
FIG. 19 shows hydrogenation of levulinic acid using Ir@Hal. To a 50 mL round bottom flask was added levullinic acid (0.41 mL, 4.00 mmol), Ir@hal 10% wt. (0.046 g), DI $H_2O$ (10 mL) and a stir bar. The reaction was allowed to stir under $H_2$ at 50° C. overnight. The Ir@Hal cat. was filtered via vacuum filtration and the washed with EtOAc (20 mL) and DI $H_2O$ (10 mL). The filtrate was then transferred to a separatory funnel. The organic phase was isolated and dried over $Na_2SO_4$. The solvent was removed under vacuum to afford the γ-valerolactone (0.247 g, 62%). Purity was verified via TLC using 2:8, EtOAc/Hexanes and NMR.

See, for example, FIG. 17 and FIG. 18.

Example 8

Cu@Hal Catalyzed Ullmann Coupling Reaction

See FIG. 24, for example.

To a 50 mL round bottom flask equipped with a stir bar was added imidazole (0.20 g, 3.0 mmol, 3 equiv), 4-chlorobenzonitrile (0.21 g, 1.5 mmol, 1 equiv), Cs$_2$CO$_3$ (0.65 g, 2.0 mmol), deionized water (3 mL), and EtOH (6 mL). The catalyst Cu@Hal 10% wt. (0.021 g) was placed in a vial with EtOH (3 mL) and sonicated to ensure dispersion. The catalyst was then added to the reaction mixture via pipette and the reaction was heated to 80° C. overnight. The reaction was monitored by TLC using 2:8, EtOAc/Hexanes. Upon completion, the reaction was cooled to room temperature. The cat. Cu@Hal was filtered off from the reaction mixture via vacuum filtration and washed with deionized water (20 mL) and dichloromethane (20 mL). The filtrate was then placed into a separatory funnel and extracted with dichloromethane (3×20 mL). The organic phase was dried over Na$_2$SO$_4$. The solvent was removed under vacuum to afford a white solid (0.192 g, 76%). Purity was confirmed by NMR and melting point (153-155° C.).

EQUIVALENTS

Those skilled in the art will recognize, or be able to ascertain, using no more than routine experimentation, numerous equivalents to the specific substances and procedures described herein. Such equivalents are considered to be within the scope of this invention, and are covered by the following claims.

What is claimed is:

1. A transition metal catalyst system comprising:
   a halloysite-based nanocomposite, the nanocomposite comprising transition metal nanoparticles embedded upon the internal surface of a halloysite nanotube wherein the transition metal comprises copper (Cu), palladium (Pd), Iridium (Ir) or rhodium (Rh), and wherein the size of the nanoparticles is less than 25 nm;
   a solvent, a base, and a capping agent,
   wherein the solvent comprises water, wherein the capping agent comprises a water soluble chemical,
   wherein the halloysite nanotube comprises a hydrated structure,
   and wherein the capping agent is operable to form the transition metal nanoparticles in an aqueous solution and prevent agglomeration.

2. The transition metal catalyst system of claim 1, wherein the internal diameter of the halloysite nanotube is less than about 40 nm.

3. The transition metal catalyst system of claim 1, wherein the transition metal comprises a transition metal alloy.

4. The transition metal catalyst system of claim 1, wherein the nanocomposite catalyzes the formation of C—O bonds, C—H bonds, C—C bonds, C—N bonds, or both.

* * * * *